United States Patent
Dudley et al.

(10) Patent No.: US 10,581,125 B2
(45) Date of Patent: Mar. 3, 2020

(54) BATTERY SYSTEM HAVING A METALLIC END PLATE WITH THERMALLY CONDUCTIVE ADHESIVE PORTIONS THEREON

(71) Applicant: LG Chem, Ltd., Seoul (KR)

(72) Inventors: Scott Dudley, Commerce Township, MI (US); Robert Merriman, Shelby Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 427 days.

(21) Appl. No.: 15/359,983

(22) Filed: Nov. 23, 2016

(65) Prior Publication Data

US 2018/0123191 A1    May 3, 2018

Related U.S. Application Data

(60) Provisional application No. 62/416,391, filed on Nov. 2, 2016.

(51) Int. Cl.
*H01M 10/613* (2014.01)
*H01M 10/647* (2014.01)
(Continued)

(52) U.S. Cl.
CPC ......... *H01M 10/613* (2015.04); *H01M 2/021* (2013.01); *H01M 2/024* (2013.01);
(Continued)

(58) Field of Classification Search
None
See application file for complete search history.

(56) References Cited

U.S. PATENT DOCUMENTS

| 6,783,630 B2 | 8/2004 | Shajii et al. |
| 7,166,187 B2 | 1/2007 | Shajii et al. |

(Continued)

FOREIGN PATENT DOCUMENTS

| CN | 205621774 U | 10/2016 |
| EP | 2866296 A1 | 4/2015 |

(Continued)

OTHER PUBLICATIONS

U.S. Appl. No. 15/044,296, filed Feb. 16, 2016 entitled Battery System.

(Continued)

*Primary Examiner* — Barbara L Gilliam
*Assistant Examiner* — Zhongqing Wei
(74) *Attorney, Agent, or Firm* — Buckert Patent & Trademark Law Firm PC; John F. Buckert

(57) ABSTRACT

A battery system includes a first metallic end plate. A first side of the first metallic end plate has first and second slanted surfaces and a first groove. The battery system further includes a first pouch battery cell having a first pouch housing with a first end portion and a second end portion. The first end portion has a first extension portion and first and second slanted end surfaces. The first pouch battery cell is coupled to the first metallic end plate such that the first extension portion of the first pouch battery cell is disposed in the first groove of the first metallic end plate, and the first and second slanted end surfaces of the first pouch battery cell are disposed on and against first and second thermally conductive adhesive portions, respectively, on the first and second slanted surfaces, respectively, of the first metallic end plate.

10 Claims, 13 Drawing Sheets

(51) Int. Cl.
  *H01M 10/6569* (2014.01)
  *H01M 2/02* (2006.01)
  *H01M 2/10* (2006.01)
  *H01M 6/50* (2006.01)
  *H01M 10/6554* (2014.01)
  *H01M 10/653* (2014.01)
  *H01M 10/6556* (2014.01)
  *H01M 10/6568* (2014.01)
  *H01M 2/20* (2006.01)

(52) U.S. Cl.
  CPC ....... *H01M 2/0212* (2013.01); *H01M 2/0217* (2013.01); *H01M 2/1061* (2013.01); *H01M 2/1077* (2013.01); *H01M 2/206* (2013.01); *H01M 6/5038* (2013.01); *H01M 10/647* (2015.04); *H01M 10/653* (2015.04); *H01M 10/6554* (2015.04); *H01M 10/6556* (2015.04); *H01M 10/6568* (2015.04); *H01M 10/6569* (2015.04)

(56) References Cited

U.S. PATENT DOCUMENTS

| | | | |
|---|---|---|---|
| 8,574,740 | B2 | 11/2013 | Quick et al. |
| 8,927,131 | B2 | 1/2015 | Wang |
| 8,968,906 | B2 | 3/2015 | Hsu et al. |
| 9,065,158 | B2 | 6/2015 | Martz et al. |
| 2006/0216582 | A1* | 9/2006 | Lee .................... H01M 2/1077 429/120 |
| 2007/0207377 | A1* | 9/2007 | Han .................... H01M 2/021 429/162 |
| 2011/0008665 | A1 | 1/2011 | Yoon et al. |
| 2011/0104545 | A1 | 5/2011 | Meintschel et al. |
| 2011/0200862 | A1* | 8/2011 | Kurosawa ........... H01M 2/1016 429/120 |
| 2011/0212355 | A1 | 9/2011 | Essinger et al. |
| 2011/0318634 | A1* | 12/2011 | Uh .................... H01M 2/04 429/178 |
| 2012/0009457 | A1 | 1/2012 | Lee et al. |
| 2012/0040221 | A1 | 2/2012 | Stoughton et al. |
| 2015/0064540 | A1 | 3/2015 | Roh et al. |
| 2015/0093608 | A1 | 4/2015 | Seong et al. |
| 2016/0079636 | A1 | 3/2016 | Spence et al. |
| 2016/0079639 | A1 | 3/2016 | Pinon |
| 2016/0233465 | A1 | 8/2016 | Lee et al. |
| 2018/0040932 | A1 | 2/2018 | Lee et al. |
| 2018/0076493 | A1 | 3/2018 | Park et al. |
| 2018/0294535 | A1 | 10/2018 | Choi et al. |

FOREIGN PATENT DOCUMENTS

| | | | | |
|---|---|---|---|---|
| JP | 2007238750 | A | 9/2007 | |
| JP | 2008159440 | A | 7/2008 | |
| JP | 2010536127 | A | 11/2010 | |
| JP | 2011503793 | A | 1/2011 | |
| JP | 2011171029 | A | 9/2011 | |
| JP | 2012506106 | A | 3/2012 | |
| JP | 2013051099 | A | 3/2013 | |
| JP | 2014082047 | A | 5/2014 | |
| JP | 2014216113 | A | 11/2014 | |
| JP | 2015520922 | A | 7/2015 | |
| JP | 2018510463 | A | 4/2018 | |
| JP | 2018530896 | A | 10/2018 | |
| KR | 20070025391 | A | 3/2007 | |
| KR | 20100041452 | A | 4/2010 | |
| KR | 20140037351 | A | 3/2014 | |
| KR | 20150111757 | A | 10/2015 | |
| WO | 2008078586 | A1 | 7/2008 | |
| WO | 2011061931 | A1 | 5/2011 | |
| WO | WO-2013000908 | A1 * | 1/2013 | ......... H01M 2/1077 |
| WO | 2016137303 | A1 | 9/2016 | |

OTHER PUBLICATIONS

U.S. Appl. No. 15/141,538, filed Apr. 28, 2016 entitled Battery System and Method of Assembling the Battery System.

European Search Report for European Patent Application No. 17866407 dated Feb. 1, 2019.

* cited by examiner

FIRST END OF FIRST EXTENSION
PORTION OF THE FIRST POUCH
HOUSING

SECOND END OF FIRST EXTENSION
PORTION OF THE FIRST POUCH HOUSING

BATTERY SYSTEM HAVING A METALLIC END PLATE WITH THERMALLY CONDUCTIVE ADHESIVE PORTIONS THEREON

CROSS-REFERENCE TO RELATED APPLICATION

This application claims priority to U.S. Provisional Patent Application No. 62/416,391 filed on Nov. 2, 2016, the entire contents of which are hereby incorporated by reference herein.

BACKGROUND

The inventors herein have recognized a need for an improved battery system that utilizes metallic end plates that are coupled to end portions of pouch battery cells of a battery module to transfer heat energy from the pouch battery cells to a refrigerant flowing through the metallic end plates, without utilizing internal cooling fins disposed between the pouch battery cells.

SUMMARY

A battery system in accordance with an exemplary embodiment is provided. The battery system includes a first metallic end plate having a first side and a second side. The first side of the first metallic end plate has first and second slanted surfaces and a first groove. The first and second slanted surfaces of the first metallic end plate extend inwardly into the first metallic end plate and toward one another. The first groove of the first metallic end plate is disposed between first and second ends of the first and second slanted surfaces, respectively, of the first metallic end plate and extends further into the first metallic end plate. The battery system further includes a first pouch battery cell having a first pouch housing with a first end portion and a second end portion. The first end portion of the first pouch housing has a first extension portion and first and second slanted end surfaces. The first extension portion of the first pouch housing has a first end and a second end. The first slanted end surface of the first pouch housing extends from the first end of the first extension portion of the first pouch housing. The second slanted end surface of the first pouch housing extends from the first end of the first extension portion of the first pouch housing and away from the first slanted end surface of the first pouch housing. The battery system further includes first and second thermally conductive adhesive portions that are disposed on the first and second slanted surfaces, respectively, of the first metallic end plate. The first pouch battery cell is coupled to the first metallic end plate such that the first extension portion of the first pouch battery cell is disposed in the first groove of the first metallic end plate, and the first and second slanted end surfaces of the first pouch battery cell are disposed on and against the first and second thermally conductive adhesive portions, respectively, on the first and second slanted surfaces, respectively, of the first metallic end plate. The second side of the first metallic end plate has a first receiving bracket with first and second finger portions and a first receiving surface. The first receiving surface of the first metallic end plate is at least partially defined by the first and second finger portions of the first metallic end plate and extends into the first receiving bracket of the first metallic end plate. The battery system further includes a first conduit that is disposed against the first receiving surface of the first receiving bracket and is disposed between the first and second finger portions of the first metallic end plate. The first conduit has a refrigerant flowing therethrough such that the first metallic end plate transfers heat energy from the first pouch battery cell into the refrigerant.

DETAILED DESCRIPTION

Referring to FIGS. 1-16, a power supply system 10 having a battery system 20 in accordance with an exemplary embodiment, and a refrigerant supply system 22 is provided.

Figure 1:
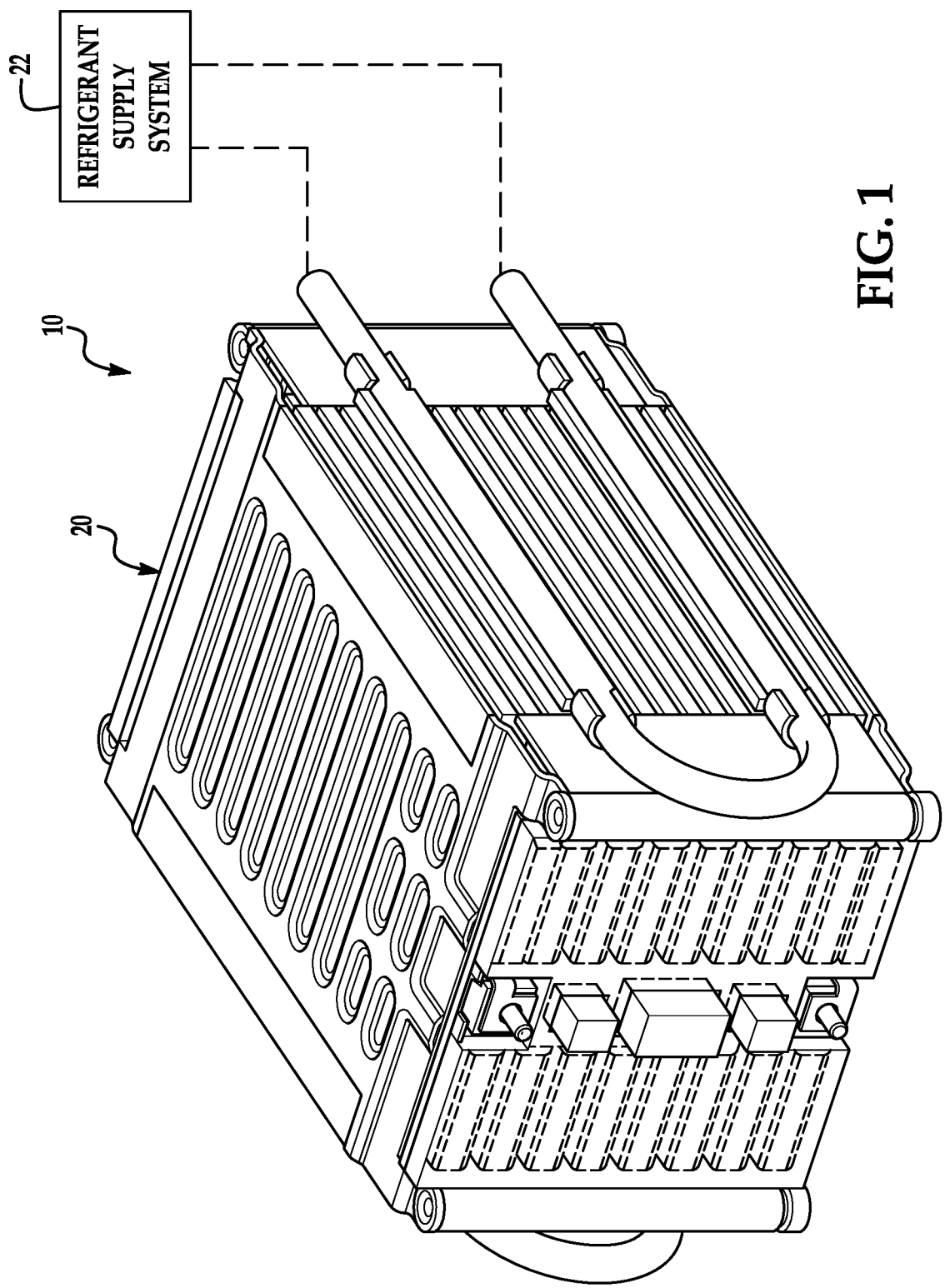
FIG. 1 is a schematic of a power supply system having a battery system in accordance with an exemplary embodiment, and a refrigerant supply system.
Figure 2:
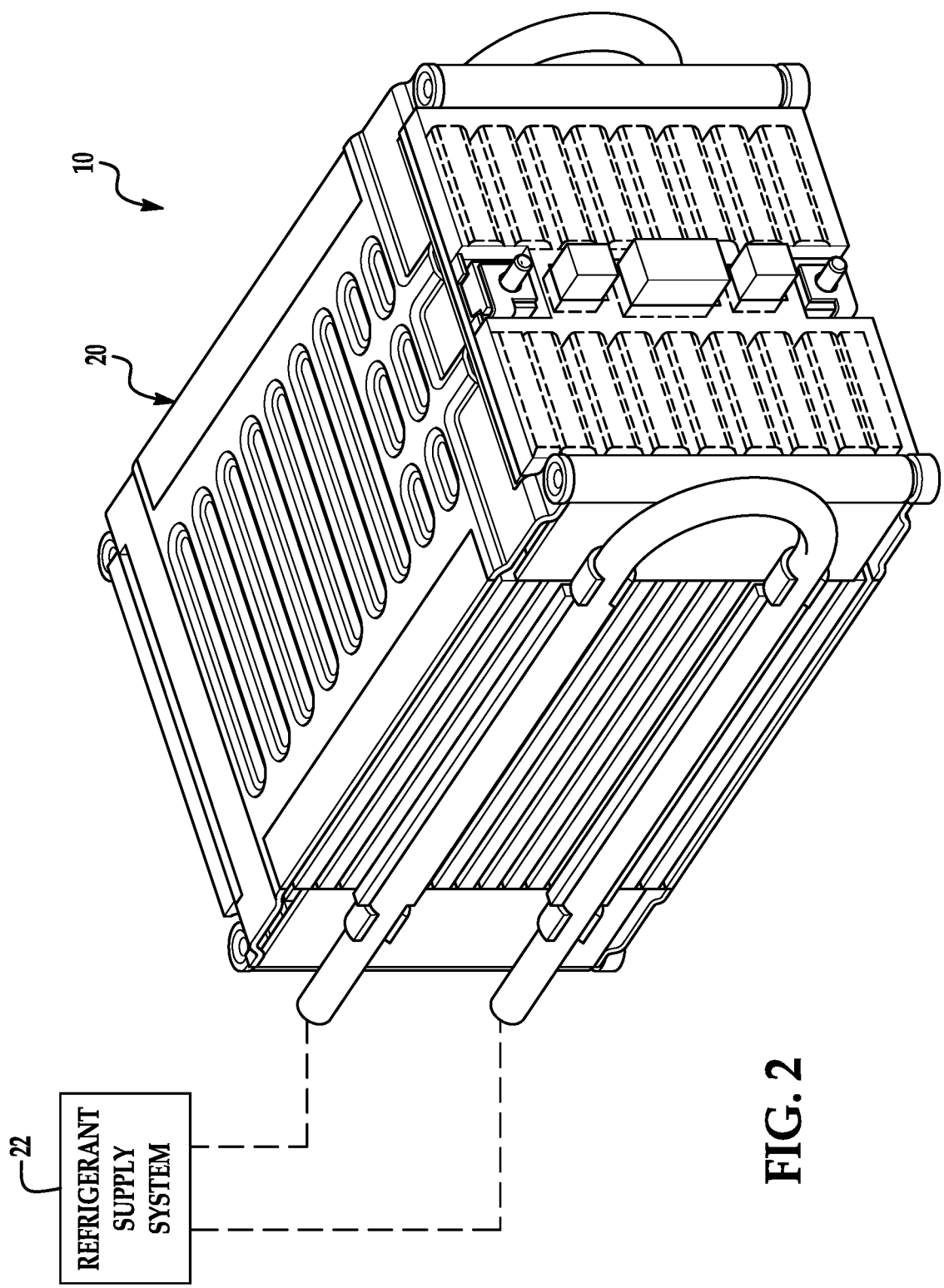
FIG. 2 is another schematic of the power supply system of FIG. 1.
Figure 3:
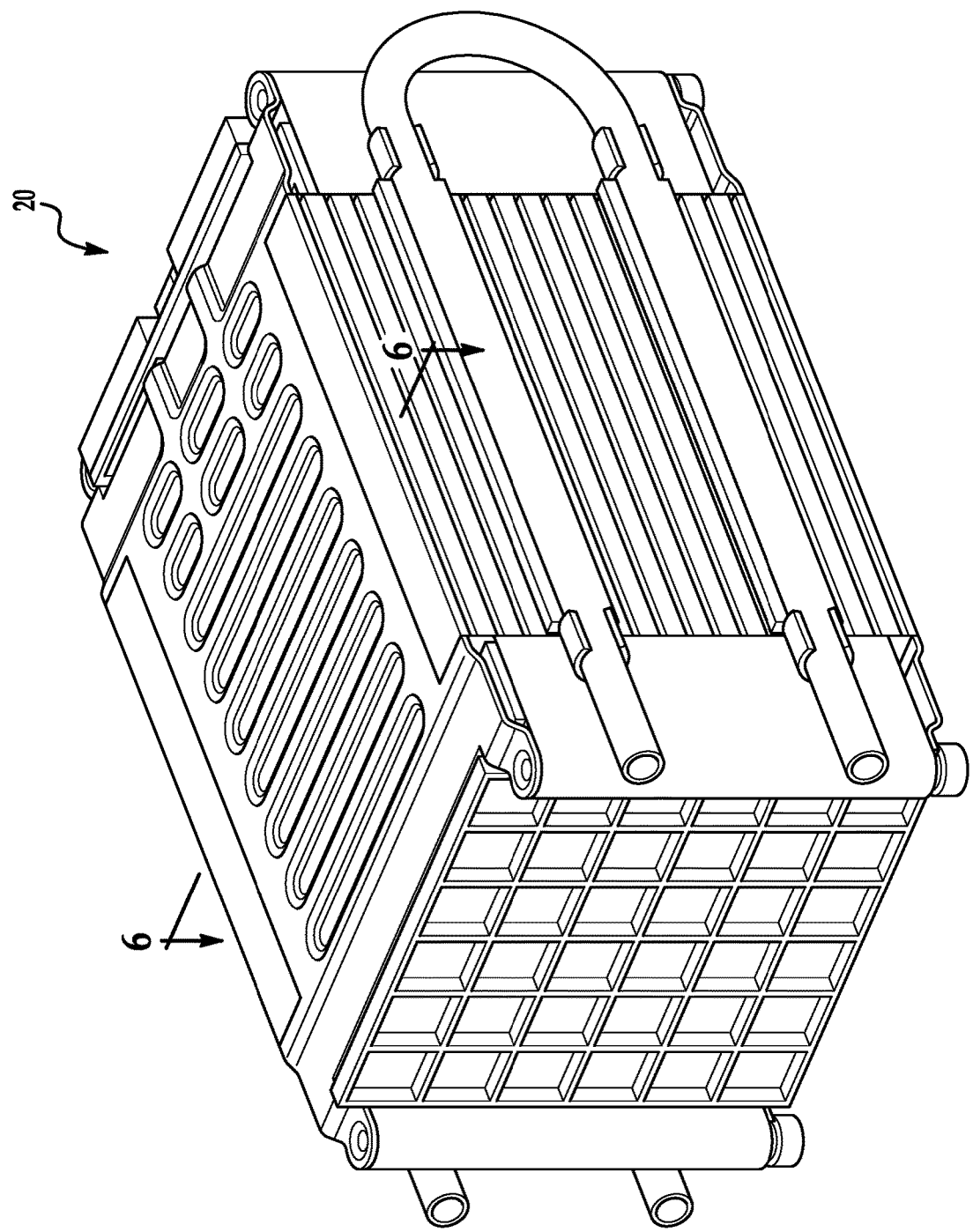
FIG. 3 is a schematic a battery module utilized in the power supply system of FIG. 1.
Figure 4:
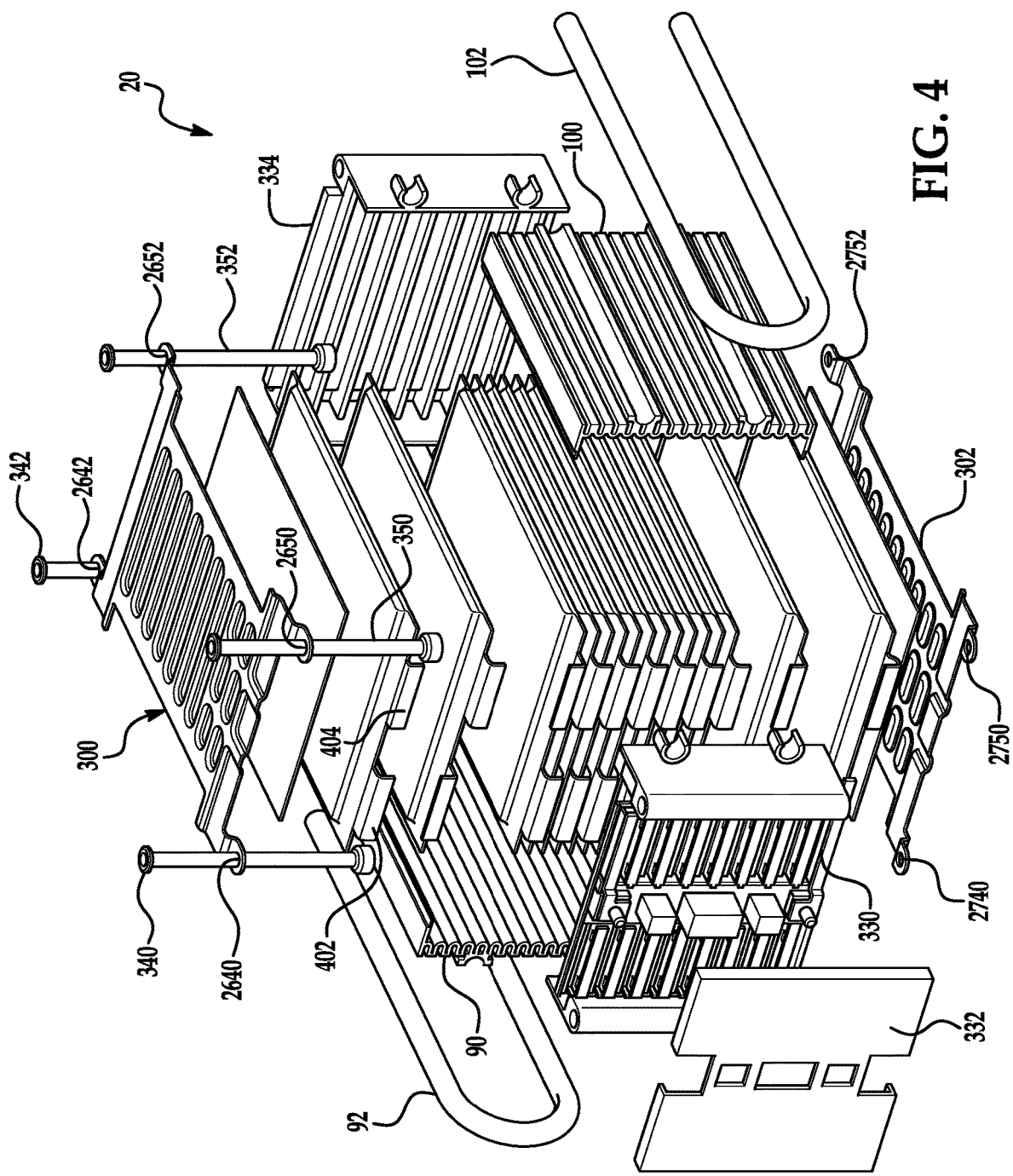
FIG. 4 is an exploded schematic of the battery module of FIG. 3.
Figure 6:
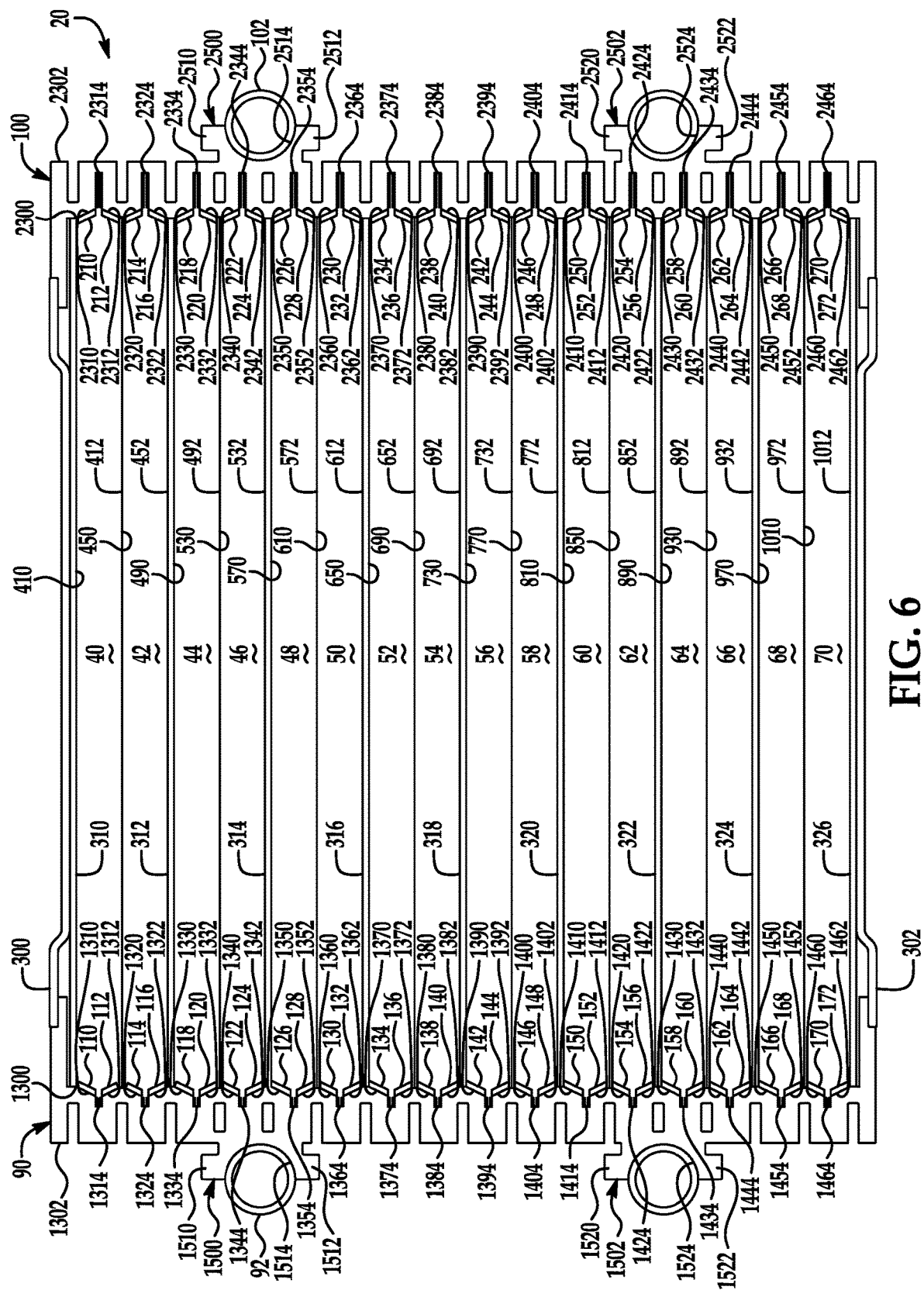
FIG. 6 is a cross-sectional schematic of the battery module of FIG. 3 taken along lines 6-6.
Figure 7:
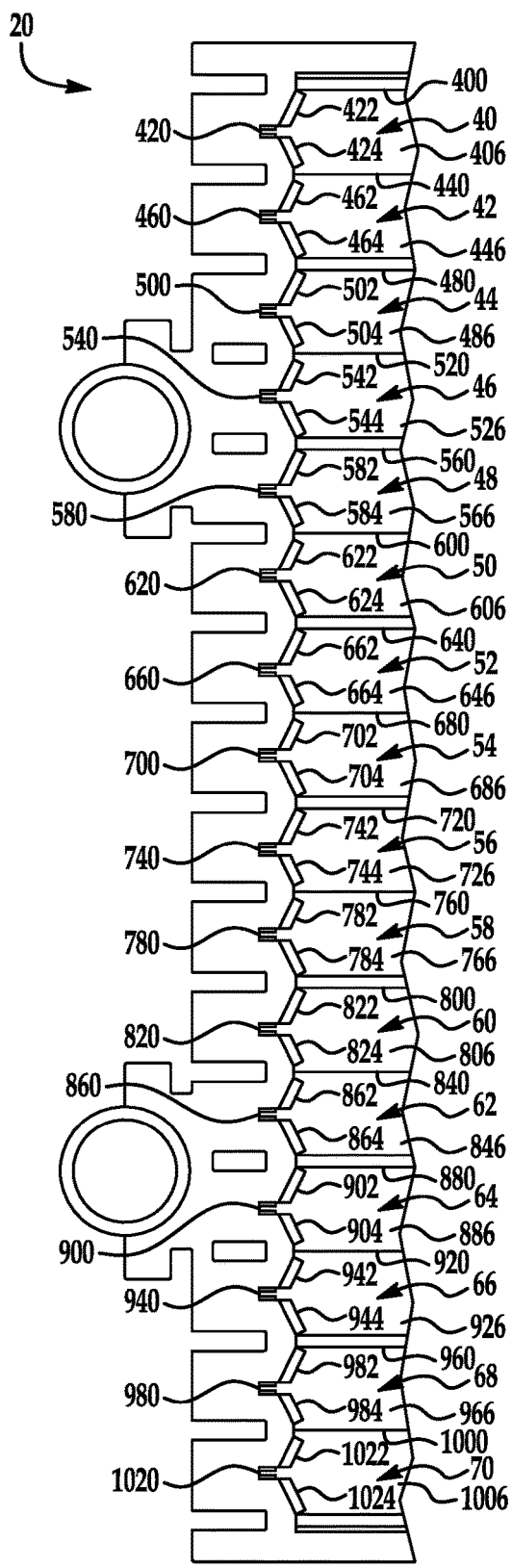
FIG. 7 is an enlarged cross-sectional schematic of a portion of the battery module of FIG. 3.

Referring to FIGS. 4, 6, and 7, the battery system 20 includes pouch battery cells, 40, 42, 44, 46, 48, 50, 52, 54, 56, 58, 60, 62, 64, 66, 68, 70, a first metallic end plate 90, a conduit 92, a second metallic end plate 100, a conduit 102, thermally conductive adhesive portions 110, 112, 114, 116, 118, 120, 122, 124, 126, 128, 130 132, 134, 136, 138, 140, 142, 144, 146, 148, 150, 152, 154, 156, 158, 160, 162, 164, 166, 168, 170, 172, 210, 212, 214, 216, 218, 220, 222, 224, 226, 228, 230, 232, 234, 236, 238, 240, 242, 244, 246, 248, 250, 252, 254, 256, 258, 260, 262, 264, 266, 268, 270, 272, end plates 300, 302, foam layers 310, 312, 314, 316, 318, 320, 322, 324, 326, an interconnect board 330, a cover 332, a side member 334, and shaft members 340, 342, 350, 352.

Figure 17:
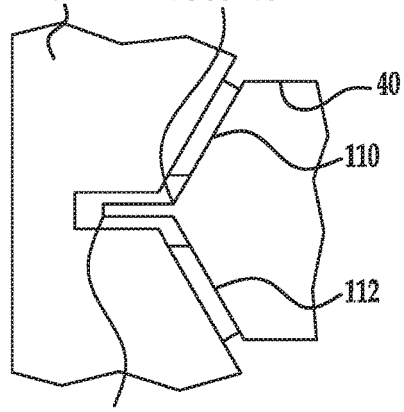
FIG. 17 is a schematic of an enlarged portion of the first metallic end plate of FIG. 9 and a pouch battery cell.
Figure 18:
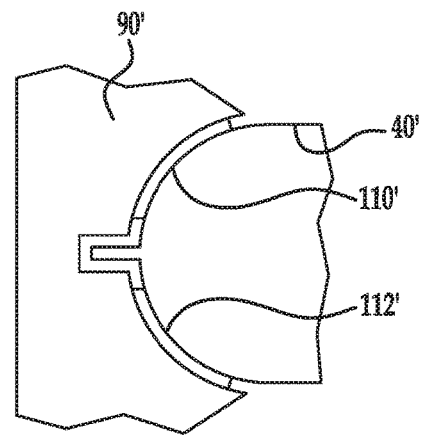
FIG. 18 is a schematic of an enlarged portion of an alternative embodiment of the first metallic end plate of FIG. 9 and a pouch battery cell.

For purposes of understanding, the slanted surfaces of the metallic end plate 90 (and metallic end plate 102) can either be slanted flat surfaces as shown in FIG. 17, or slanted arcuate-shaped surfaces (on metallic end plate 90') as shown in FIG. 18. Further, the slanted end surfaces of each pouch battery cell can either be slanted flat end surfaces as shown in FIG. 17, or slanted arcuate-shaped end surfaces (on pouch battery cell 40') as shown in FIG. 18 coupled to thermally conductive adhesive portions 110', 112'. Further, a conduit portion comprises a portion of a conduit.

Figure 8:
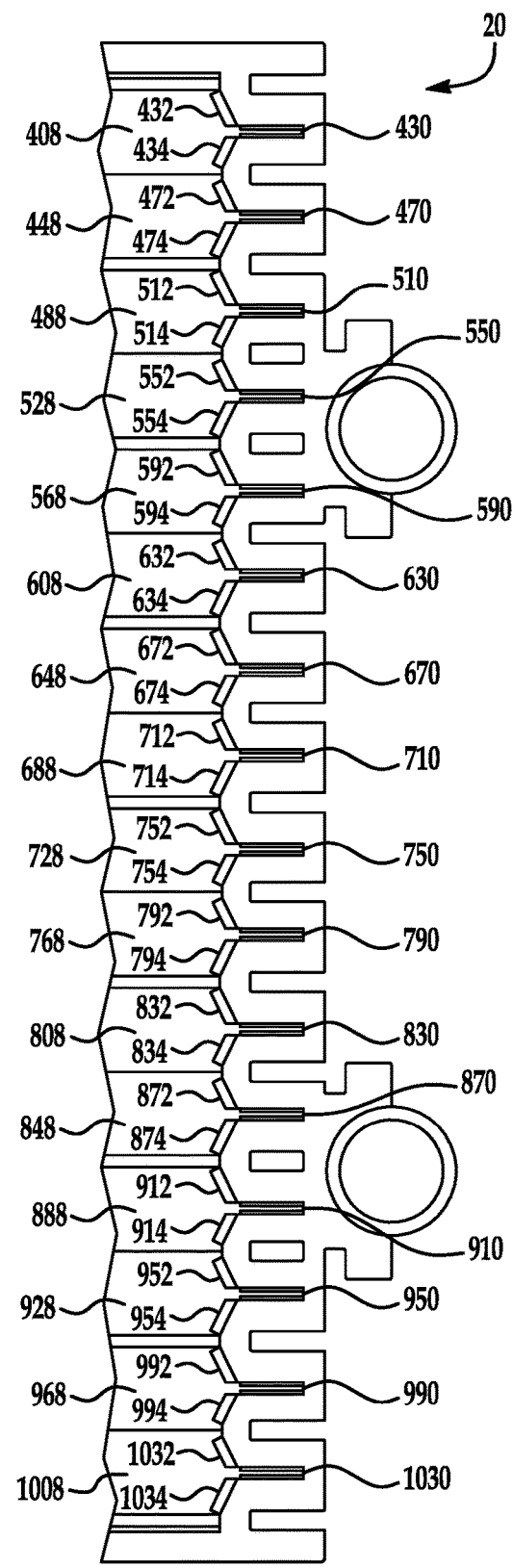
FIG. 8 is another enlarged cross-sectional schematic of a portion of the battery module of FIG. 3.
Figure 9:
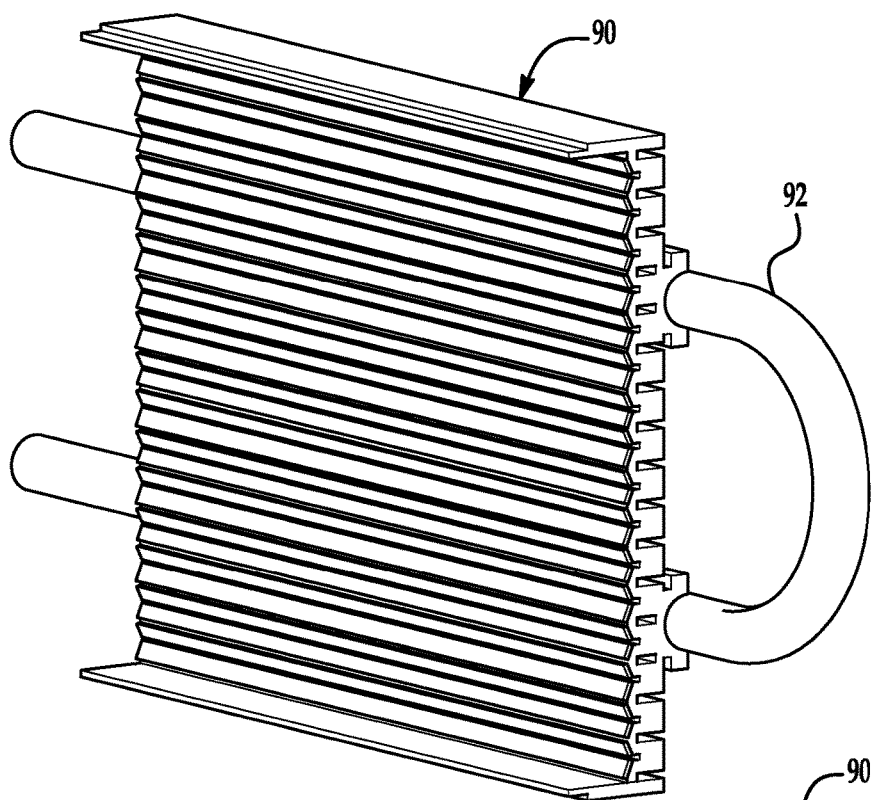
FIG. 9 is a schematic of a first metallic end plate utilized in the battery module of FIG. 3.
Figure 10:
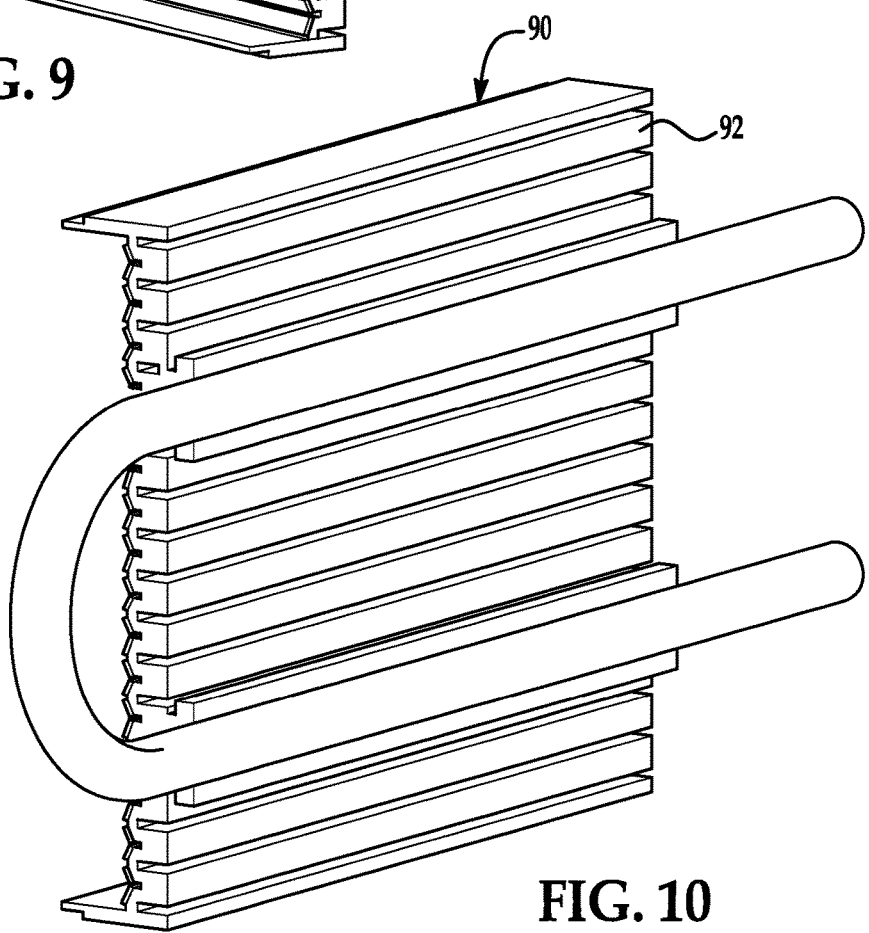
FIG. 10 is another schematic of the first metallic end plate of FIG. 9.
Figure 11:
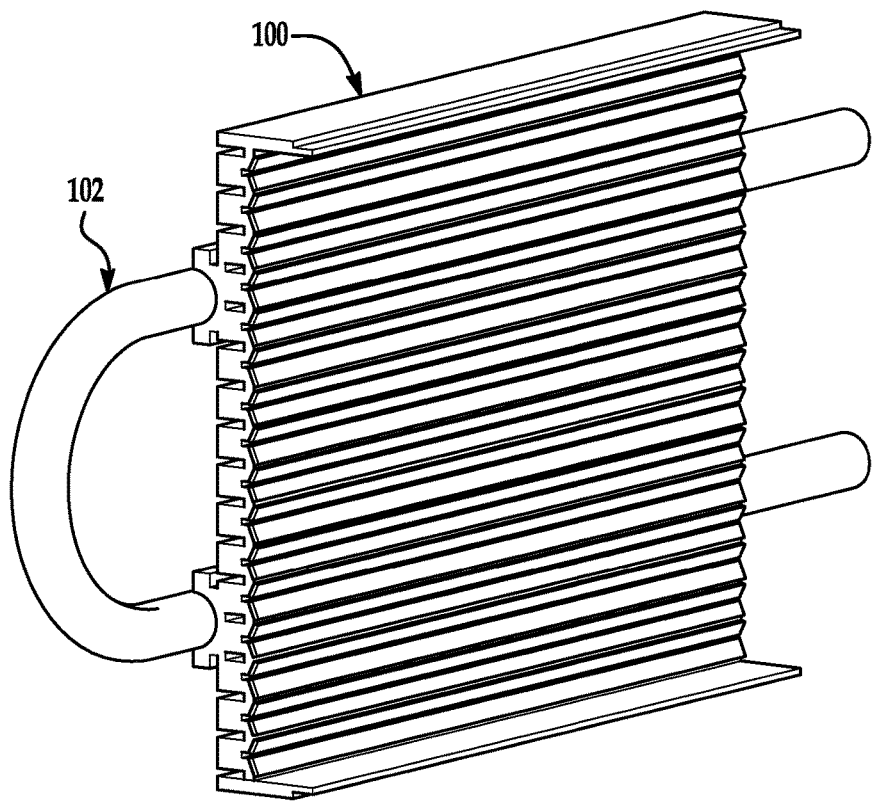
FIG. 11 is a schematic of a second metallic end plate utilized in the battery module of FIG. 3.
Figure 12:
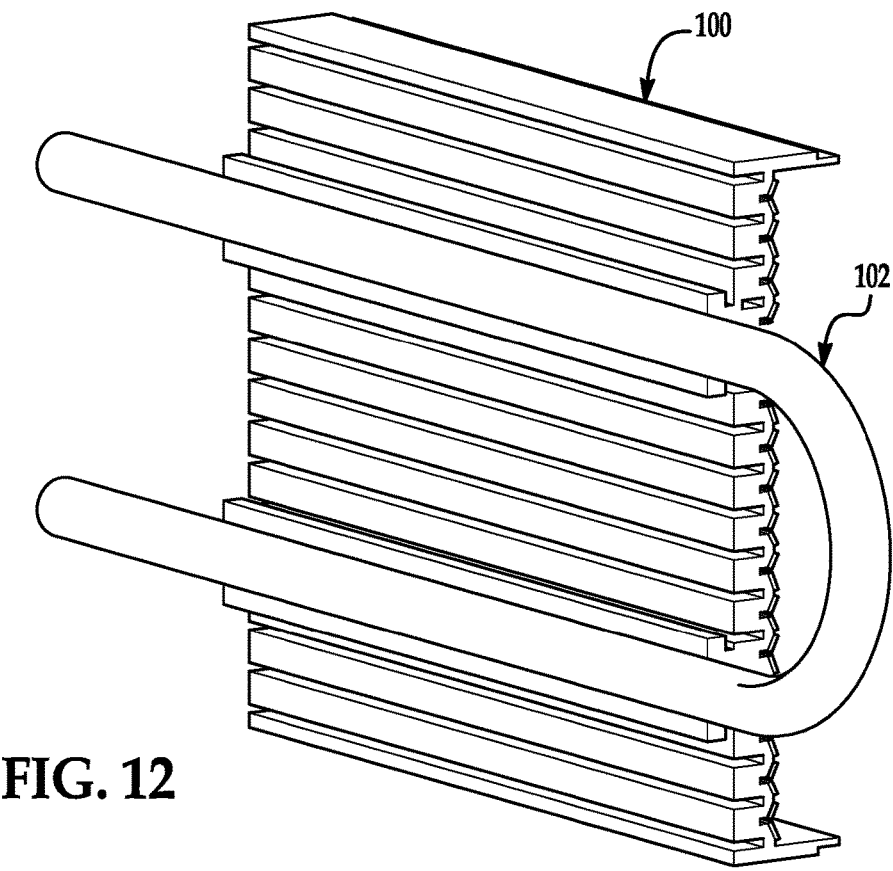
FIG. 12 is another schematic of the second metallic end plate of FIG. 11.
Figure 13:
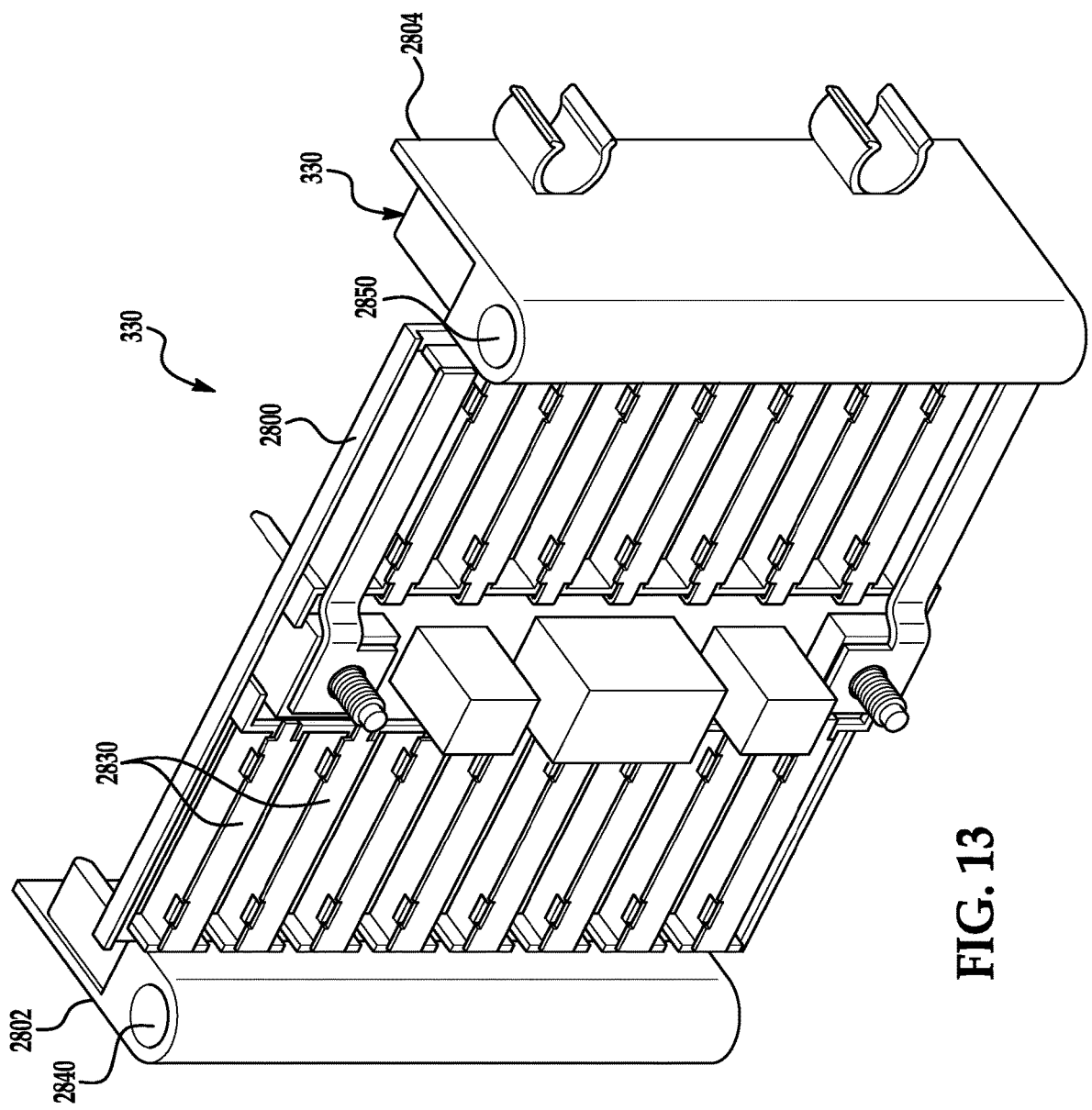
FIG. 13 is a schematic of an interconnect board utilized in the battery module of FIG. 3.
Figure 14:
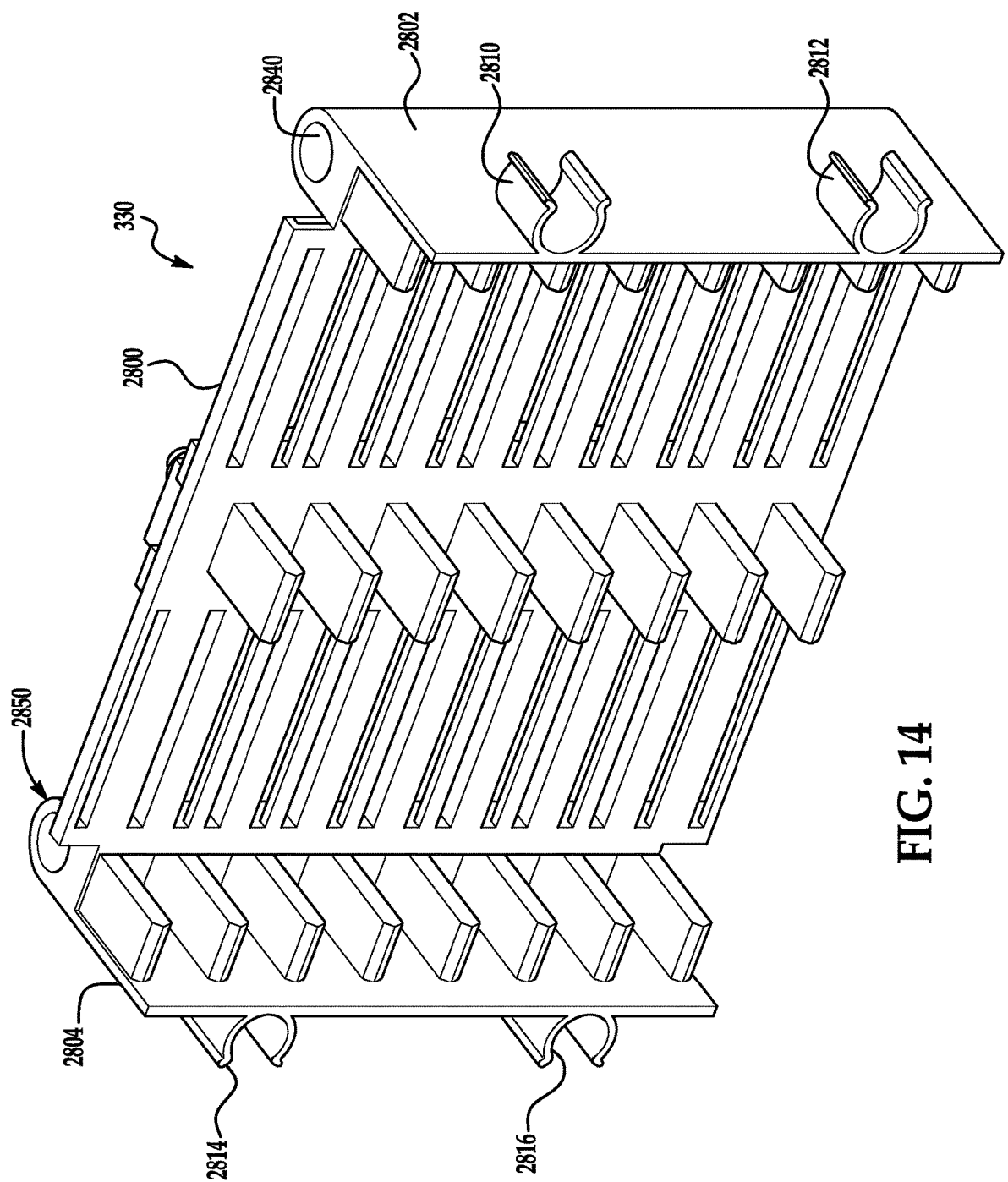
FIG. 14 is another schematic of the interconnect board of FIG. 13.

Referring to FIGS. 6-8, the pouch battery cell 40 is coupled to both the first and second metallic end plates 90, 100. The pouch battery cell 40 includes a pouch housing 400, first and second electrical terminals 402, 404 (shown in FIG. 4) extending outwardly from the pouch housing 400. The pouch housing 400 includes a first end portion 406, a second end portion 408, and major surfaces 410, 412. The first end portion 406 includes an extension portion 420 and slanted end surfaces 422, 424. The extension portion 420 has a first end and a second end. The slanted end surface 422 extends from the first end of the extension portion 420. The slanted end surface 424 extends from the first end of the extension portion 420 and away from the slanted end surface 422. The second end portion 408 includes an extension portion 430 and slanted end surfaces 432, 434. The extension portion 430 has a first end and a second end. The slanted end surface 432 extends from the first end of the extension portion 430. The slanted end surface 434 extends from the first end of the extension portion 430 and away from the slanted end surface 432.

The pouch battery cell 42 is coupled to both the first and second metallic end plates 90, 100. The pouch battery cell 42 includes a pouch housing 440, first and second electrical terminals (shown in FIG. 4) extending outwardly from the pouch housing 440. The pouch housing 440 includes a first end portion 446, a second end portion 448, and major surfaces 450, 452. The first end portion 446 includes an extension portion 460 and slanted end surfaces 462, 464. The extension portion 460 has a first end and a second end. The slanted end surface 462 extends from the first end of the extension portion 460. The slanted end surface 464 extends from the first end of the extension portion 460 and away from the slanted end surface 462. The second end portion 448 includes an extension portion 470 and slanted end surfaces 472, 474. The extension portion 470 has a first end and a second end. The slanted end surface 472 extends from the first end of the extension portion 470. The slanted end surface 474 extends from the first end of the extension portion 470 and away from the slanted end surface 472.

The pouch battery cell 44 is coupled to both the first and second metallic end plates 90, 100. The pouch battery cell 44 includes a pouch housing 480, first and second electrical terminals extending outwardly from the pouch housing 480. The pouch housing 480 includes a first end portion 486, a second end portion 488, and major surfaces 490, 492. The first end portion 486 includes an extension portion 500 and slanted end surfaces 502, 504. The extension portion 500 has a first end and a second end. The slanted end surface 502 extends from the first end of the extension portion 500. The slanted end surface 504 extends from the first end of the extension portion 500 and away from the slanted end surface 502. The second end portion 488 includes an extension portion 510 and slanted end surfaces 512, 514. The extension portion 510 has a first end and a second end. The slanted end surface 512 extends from the first end of the extension portion 510. The slanted end surface 514 extends from the first end of the extension portion 510 and away from the slanted end surface 512.

The pouch battery cell 46 is coupled to both the first and second metallic end plates 90, 100. The pouch battery cell 46 includes a pouch housing 520, first and second electrical terminals extending outwardly from the pouch housing 520. The pouch housing 520 includes a first end portion 526, a second end portion 528, and major surfaces 530, 532. The first end portion 526 includes an extension portion 540 and slanted end surfaces 542, 544. The extension portion 540 has a first end and a second end. The slanted end surface 542 extends from the first end of the extension portion 540. The slanted end surface 544 extends from the first end of the extension portion 540 and away from the slanted end surface 542. The second end portion 528 includes an extension portion 550 and slanted end surfaces 552, 554. The extension portion 550 has a first end and a second end. The slanted end surface 552 extends from the first end of the extension portion 550. The slanted end surface 554 extends from the first end of the extension portion 550 and away from the slanted end surface 552.

The pouch battery cell 48 is coupled to both the first and second metallic end plates 90, 100. The pouch battery cell 48 includes a pouch housing 560, first and second electrical terminals extending outwardly from the pouch housing 560. The pouch housing 560 includes a first end portion 566, a second end portion 568, and major surfaces 570, 572. The first end portion 566 includes an extension portion 580 and slanted end surfaces 582, 584. The extension portion 580 has a first end and a second end. The slanted end surface 582 extends from the first end of the extension portion 580. The slanted end surface 584 extends from the first end of the extension portion 580 and away from the slanted end surface 582. The second end portion 568 includes an extension portion 590 and slanted end surfaces 592, 594. The extension portion 590 has a first end and a second end. The slanted end surface 592 extends from the first end of the extension portion 590. The slanted end surface 594 extends from the first end of the extension portion 590 and away from the slanted end surface 592.

The pouch battery cell 50 is coupled to both the first and second metallic end plates 90, 100. The pouch battery cell 50 includes a pouch housing 600, first and second electrical terminals extending outwardly from the pouch housing 600. The pouch housing 600 includes a first end portion 606, a second end portion 608, and major surfaces 610, 612. The first end portion 606 includes an extension portion 620 and slanted end surfaces 622, 624. The extension portion 620 has a first end and a second end. The slanted end surface 622 extends from the first end of the extension portion 620. The slanted end surface 624 extends from the first end of the extension portion 620 and away from the slanted end surface 622. The second end portion 608 includes an extension portion 630 and slanted end surfaces 632, 634. The extension portion 630 has a first end and a second end. The slanted end surface 632 extends from the first end of the extension portion 630. The slanted end surface 634 extends from the first end of the extension portion 630 and away from the slanted end surface 632.

The pouch battery cell 52 is coupled to both the first and second metallic end plates 90, 100. The pouch battery cell 52 includes a pouch housing 640, first and second electrical terminals extending outwardly from the pouch housing 640. The pouch housing 640 includes a first end portion 646, a second end portion 648, and major surfaces 650, 652. The first end portion 646 includes an extension portion 660 and slanted end surfaces 662, 664. The extension portion 660 has a first end and a second end. The slanted end surface 662 extends from the first end of the extension portion 660. The slanted end surface 664 extends from the first end of the extension portion 660 and away from the slanted end surface 662. The second end portion 648 includes an extension portion 670 and slanted end surfaces 672, 674. The extension portion 670 has a first end and a second end. The slanted end surface 672 extends from the first end of the extension portion 670. The slanted end surface 674 extends from the first end of the extension portion 670 and away from the slanted end surface 672.

The pouch battery cell 54 is coupled to both the first and second metallic end plates 90, 100. The pouch battery cell 54 includes a pouch housing 680, first and second electrical terminals extending outwardly from the pouch housing 680. The pouch housing 680 includes a first end portion 686, a second end portion 688, and major surfaces 690, 692. The first end portion 686 includes an extension portion 700 and slanted end surfaces 702, 704. The extension portion 700 has a first end and a second end. The slanted end surface 702 extends from the first end of the extension portion 700. The slanted end surface 704 extends from the first end of the extension portion 700 and away from the slanted end surface 702. The second end portion 688 includes an extension portion 710 and slanted end surfaces 712, 714. The extension portion 710 has a first end and a second end. The slanted end surface 712 extends from the first end of the extension portion 710. The slanted end surface 714 extends from the first end of the extension portion 710 and away from the slanted end surface 712.

The pouch battery cell 56 is coupled to both the first and second metallic end plates 90, 100. The pouch battery cell 56 includes a pouch housing 720, first and second electrical terminals extending outwardly from the pouch housing 720. The pouch housing 720 includes a first end portion 726, a second end portion 728, and major surfaces 730, 732. The first end portion 726 includes an extension portion 740 and slanted end surfaces 742, 744. The extension portion 740 has a first end and a second end. The slanted end surface 742 extends from the first end of the extension portion 740. The slanted end surface 744 extends from the first end of the extension portion 740 and away from the slanted end surface 742. The second end portion 728 includes an extension portion 750 and slanted end surfaces 752, 754. The extension portion 750 has a first end and a second end. The slanted end surface 752 extends from the first end of the extension portion 750. The slanted end surface 754 extends from the first end of the extension portion 750 and away from the slanted end surface 752.

The pouch battery cell 58 is coupled to both the first and second metallic end plates 90, 100. The pouch battery cell 58 includes a pouch housing 760, first and second electrical terminals extending outwardly from the pouch housing 760. The pouch housing 760 includes a first end portion 766, a second end portion 768, and major surfaces 770, 772. The first end portion 766 includes an extension portion 780 and slanted end surfaces 782, 784. The extension portion 780 has a first end and a second end. The slanted end surface 782 extends from the first end of the extension portion 780. The slanted end surface 784 extends from the first end of the extension portion 780 and away from the slanted end surface 782. The second end portion 768 includes an extension portion 790 and slanted end surfaces 792, 794. The extension portion 790 has a first end and a second end. The slanted end surface 792 extends from the first end of the extension portion 790. The slanted end surface 794 extends from the first end of the extension portion 790 and away from the slanted end surface 792.

The pouch battery cell 60 is coupled to both the first and second metallic end plates 90, 100. The pouch battery cell 60 includes a pouch housing 800, first and second electrical terminals extending outwardly from the pouch housing 800. The pouch housing 800 includes a first end portion 806, a second end portion 808, and major surfaces 810, 812. The first end portion 806 includes an extension portion 820 and slanted end surfaces 822, 824. The extension portion 820 has a first end and a second end. The slanted end surface 822 extends from the first end of the extension portion 820. The slanted end surface 824 extends from the first end of the extension portion 820 and away from the slanted end surface 822. The second end portion 808 includes an extension portion 830 and slanted end surfaces 832, 834. The extension portion 830 has a first end and a second end. The slanted end surface 832 extends from the first end of the extension portion 830. The slanted end surface 834 extends from the first end of the extension portion 830 and away from the slanted end surface 832.

The pouch battery cell 62 is coupled to both the first and second metallic end plates 90, 100. The pouch battery cell 62 includes a pouch housing 840, first and second electrical terminals extending outwardly from the pouch housing 840. The pouch housing 840 includes a first end portion 846, a second end portion 848, and major surfaces 850, 852. The first end portion 846 includes an extension portion 860 and slanted end surfaces 862, 864. The extension portion 860 has a first end and a second end. The slanted end surface 862 extends from the first end of the extension portion 860. The slanted end surface 864 extends from the first end of the extension portion 860 and away from the slanted end surface 862. The second end portion 848 includes an extension portion 870 and slanted end surfaces 872, 874. The extension portion 870 has a first end and a second end. The slanted end surface 872 extends from the first end of the extension portion 870. The slanted end surface 874 extends from the first end of the extension portion 870 and away from the slanted end surface 872.

The pouch battery cell 64 is coupled to both the first and second metallic end plates 90, 100. The pouch battery cell 64 includes a pouch housing 880, first and second electrical terminals extending outwardly from the pouch housing 880. The pouch housing 880 includes a first end portion 886, a second end portion 888, and major surfaces 890, 892. The first end portion 886 includes an extension portion 900 and slanted end surfaces 902, 904. The extension portion 900 has a first end and a second end. The slanted end surface 902 extends from the first end of the extension portion 900. The slanted end surface 904 extends from the first end of the extension portion 900 and away from the slanted end surface 902. The second end portion 888 includes an extension portion 910 and slanted end surfaces 912, 914. The extension portion 910 has a first end and a second end. The slanted end surface 912 extends from the first end of the extension portion 910. The slanted end surface 914 extends from the first end of the extension portion 910 and away from the slanted end surface 912.

The pouch battery cell 66 is coupled to both the first and second metallic end plates 90, 100. The pouch battery cell 66 includes a pouch housing 920, first and second electrical terminals extending outwardly from the pouch housing 920. The pouch housing 920 includes a first end portion 926, a second end portion 928, and major surfaces 930, 932. The first end portion 926 includes an extension portion 940 and slanted end surfaces 942, 944. The extension portion 940 has a first end and a second end. The slanted end surface 942 extends from the first end of the extension portion 940. The slanted end surface 944 extends from the first end of the extension portion 940 and away from the slanted end surface 942. The second end portion 928 includes an extension portion 950 and slanted end surfaces 952, 954. The extension portion 950 has a first end and a second end. The slanted end surface 952 extends from the first end of the extension portion 950. The slanted end surface 954 extends from the first end of the extension portion 950 and away from the slanted end surface 952.

The pouch battery cell 68 is coupled to both the first and second metallic end plates 90, 100. The pouch battery cell 68 includes a pouch housing 960, first and second electrical terminals extending outwardly from the pouch housing 960. The pouch housing 960 includes a first end portion 966, a second end portion 968, and major surfaces 970, 972. The first end portion 966 includes an extension portion 980 and slanted end surfaces 982, 984. The extension portion 980 has a first end and a second end. The slanted end surface 982 extends from the first end of the extension portion 980. The slanted end surface 984 extends from the first end of the extension portion 980 and away from the slanted end surface 982. The second end portion 968 includes an extension portion 990 and slanted end surfaces 992, 994. The extension portion 990 has a first end and a second end. The slanted end surface 992 extends from the first end of the extension portion 990. The slanted end surface 994 extends from the first end of the extension portion 990 and away from the slanted end surface 992.

The pouch battery cell 70 is coupled to both the first and second metallic end plates 90, 100. The pouch battery cell 70 includes a pouch housing 1000, first and second electrical terminals extending outwardly from the pouch housing 1000. The pouch housing 1000 includes a first end portion 1006, a second end portion 1008, and major surfaces 1010, 1012. The first end portion 1006 includes an extension portion 1020 and slanted end surfaces 1022, 1024. The extension portion 1020 has a first end and a second end. The slanted end surface 1022 extends from the first end of the extension portion 1020. The slanted end surface 1024 extends from the first end of the extension portion 1020 and away from the slanted end surface 1022. The second end portion 1008 includes an extension portion 1030 and slanted end surfaces 1032, 1034. The extension portion 1030 has a first end and a second end. The slanted end surface 1032 extends from the first end of the extension portion 1030. The slanted end surface 1034 extends from the first end of the extension portion 1030 and away from the slanted end surface 1032.

Referring to FIGS. 1 and 6-8, the first metallic end plate 90 is provided to conduct heat energy from the pouch battery cells 40-70 into a refrigerant flowing through the first metallic end plate 90 from the refrigerant supply system 22. The first metallic end plate 90 has a first side 1300 and a second side 1302. The first side 1300 is coupled to the pouch battery cells 40-70. The second side 1302 is coupled to the conduit 92. In an exemplary embodiment, the first metallic end plate 90 is constructed of aluminum. In an alternative embodiment, the first metallic end plate 90 could be constructed of other thermally conductive metallic materials such as copper or steel for example.

The first side 1300 has slanted surfaces 1310, 1312 and a groove 1314; slanted surfaces 1320, 1322 and a groove 1324; slanted surfaces 1330, 1332 and a groove 1334; slanted surfaces 1340, 1342 and a groove 1344; slanted surfaces 1350, 1352 and a groove 1354; slanted surfaces 1360, 1362 and a groove 1364; slanted surfaces 1370, 1372 and a groove 1374; slanted surfaces 1380, 1382 and a groove 1384; slanted surfaces 1390, 1392 and a groove 1394; slanted surfaces 1400, 1402 and a groove 1404; slanted surfaces 1410, 1412 and a groove 1414; slanted surfaces 1420, 1422 and a groove 1424; slanted surfaces 1430, 1432 and a groove 1434; slanted surfaces 1440, 1442 and a groove 1444; slanted surfaces 1450, 1452 and a groove 1454; and slanted surfaces 1460, 1462 and a groove 1464.

Referring to FIGS. 6 and 7, the slanted surfaces 1310, 1312 extend inwardly into the first metallic end plate 90 and toward one another. The groove 1314 is disposed between first and second ends of the slanted surfaces 1310, 1312, respectively, and extends further into the first metallic end plate 90. The pouch battery cell 40 is coupled to the first metallic end plate 90 such that the extension portion 420 of the pouch battery cell 40 is disposed in the groove 1314 of the first metallic end plate 90, and the slanted end surfaces 422, 424 of the pouch battery cell 40 are disposed on and against the thermally conductive adhesive portions 110, 112, respectively, on the slanted surfaces 1310, 1312, respectively, of the first metallic end plate 90.

The slanted surfaces 1320, 1322 extend inwardly into the first metallic end plate 90 and toward one another. The groove 1324 is disposed between first and second ends of the slanted surfaces 1320, 1322, respectively, and extends further into the first metallic end plate 90. The pouch battery cell 42 is coupled to the first metallic end plate 90 such that the extension portion 460 of the pouch battery cell 42 is disposed in the groove 1324 of the first metallic end plate 90, and the slanted end surfaces 462, 464 of the pouch battery cell 42 are disposed on and against the thermally conductive adhesive portions 114, 116, respectively, on the slanted surfaces 1320, 1322, respectively, of the first metallic end plate 90.

The slanted surfaces 1330, 1332 extend inwardly into the first metallic end plate 90 and toward one another. The groove 1334 is disposed between first and second ends of the slanted surfaces 1330, 1332, respectively, and extends further into the first metallic end plate 90. The pouch battery cell 44 is coupled to the first metallic end plate 90 such that the extension portion 500 of the pouch battery cell 44 is disposed in the groove 1334 of the first metallic end plate 90, and the slanted end surfaces 502, 504 of the pouch battery cell 44 are disposed on and against the thermally conductive adhesive portions 118, 120, respectively, on the slanted surfaces 1330, 1332, respectively, of the first metallic end plate 90.

The slanted surfaces 1340, 1342 extend inwardly into the first metallic end plate 90 and toward one another. The groove 1344 is disposed between first and second ends of the slanted surfaces 1340, 1342, respectively, and extends further into the first metallic end plate 90. The pouch battery cell 46 is coupled to the first metallic end plate 90 such that the extension portion 540 of the pouch battery cell 46 is disposed in the groove 1344 of the first metallic end plate 90, and the slanted end surfaces 542, 544 of the pouch battery cell 46 are disposed on and against the thermally conductive adhesive portions 122, 124, respectively, on the slanted surfaces 1340, 1342, respectively, of the first metallic end plate 90.

The slanted surfaces 1350, 1352 extend inwardly into the first metallic end plate 90 and toward one another. The groove 1354 is disposed between first and second ends of the slanted surfaces 1350, 1352, respectively, and extends further into the first metallic end plate 90. The pouch battery cell 48 is coupled to the first metallic end plate 90 such that the extension portion 580 of the pouch battery cell 48 is disposed in the groove 1354 of the first metallic end plate 90, and the slanted end surfaces 582, 584 of the pouch battery cell 48 are disposed on and against the thermally conductive adhesive portions 126, 128, respectively, on the slanted surfaces 1350, 1352, respectively, of the first metallic end plate 90.

The slanted surfaces 1360, 1362 extend inwardly into the first metallic end plate 90 and toward one another. The groove 1364 is disposed between first and second ends of the slanted surfaces 1360, 1362, respectively, and extends further into the first metallic end plate 90. The pouch battery cell 50 is coupled to the first metallic end plate 90 such that the extension portion 620 of the pouch battery cell 50 is disposed in the groove 1364 of the first metallic end plate 90, and the slanted end surfaces 622, 624 of the pouch battery cell 50 are disposed on and against the thermally conductive adhesive portions 130, 132, respectively, on the slanted surfaces 1360, 1362, respectively, of the first metallic end plate 90.

The slanted surfaces 1370, 1372 extend inwardly into the first metallic end plate 90 and toward one another. The groove 1374 is disposed between first and second ends of the slanted surfaces 1370, 1372, respectively, and extends further into the first metallic end plate 90. The pouch battery cell 52 is coupled to the first metallic end plate 90 such that the extension portion 660 of the pouch battery cell 52 is disposed in the groove 1374 of the first metallic end plate 90, and the slanted end surfaces 662, 664 of the pouch battery cell 52 are disposed on and against the thermally conductive adhesive portions 134, 136, respectively, on the slanted surfaces 1370, 1372, respectively, of the first metallic end plate 90.

The slanted surfaces 1380, 1382 extend inwardly into the first metallic end plate 90 and toward one another. The groove 1384 is disposed between first and second ends of the slanted surfaces 1380, 1382, respectively, and extends further into the first metallic end plate 90. The pouch battery cell 54 is coupled to the first metallic end plate 90 such that the extension portion 700 of the pouch battery cell 54 is disposed in the groove 1384 of the first metallic end plate 90, and the slanted end surfaces 702, 704 of the pouch battery cell 54 are disposed on and against the thermally conductive adhesive portions 138, 140, respectively, on the slanted surfaces 1380, 1382, respectively, of the first metallic end plate 90.

The slanted surfaces 1390, 1392 extend inwardly into the first metallic end plate 90 and toward one another. The groove 1394 is disposed between first and second ends of the slanted surfaces 1390, 1392, respectively, and extends further into the first metallic end plate 90. The pouch battery cell 56 is coupled to the first metallic end plate 90 such that the extension portion 740 of the pouch battery cell 56 is disposed in the groove 1394 of the first metallic end plate 90, and the slanted end surfaces 742, 744 of the pouch battery cell 56 are disposed on and against the thermally conductive adhesive portions 142, 144, respectively, on the slanted surfaces 1390, 1392, respectively, of the first metallic end plate 90.

The slanted surfaces 1400, 1402 extend inwardly into the first metallic end plate 90 and toward one another. The groove 1404 is disposed between first and second ends of the slanted surfaces 1400, 1402, respectively, and extends further into the first metallic end plate 90. The pouch battery cell 58 is coupled to the first metallic end plate 90 such that the extension portion 780 of the pouch battery cell 58 is disposed in the groove 1404 of the first metallic end plate 90, and the slanted end surfaces 782, 784 of the pouch battery cell 58 are disposed on and against the thermally conductive adhesive portions 146, 148, respectively, on the slanted surfaces 1400, 1402, respectively, of the first metallic end plate 90.

The slanted surfaces 1410, 1412 extend inwardly into the first metallic end plate 90 and toward one another. The groove 1414 is disposed between first and second ends of the slanted surfaces 1410, 1412, respectively, and extends further into the first metallic end plate 90. The pouch battery cell 60 is coupled to the first metallic end plate 90 such that the extension portion 820 of the pouch battery cell 60 is disposed in the groove 1414 of the first metallic end plate 90, and the slanted end surfaces 822, 824 of the pouch battery cell 60 are disposed on and against the thermally conductive adhesive portions 150, 152, respectively, on the slanted surfaces 1410, 1412, respectively, of the first metallic end plate 90.

The slanted surfaces 1420, 1422 extend inwardly into the first metallic end plate 90 and toward one another. The groove 1424 is disposed between first and second ends of the slanted surfaces 1420, 1422, respectively, and extends further into the first metallic end plate 90. The pouch battery cell 62 is coupled to the first metallic end plate 90 such that the extension portion 860 of the pouch battery cell 62 is disposed in the groove 1424 of the first metallic end plate 90, and the slanted end surfaces 862, 864 of the pouch battery cell 62 are disposed on and against the thermally conductive adhesive portions 154, 156, respectively, on the slanted surfaces 1420, 1422, respectively, of the first metallic end plate 90.

The slanted surfaces 1430, 1432 extend inwardly into the first metallic end plate 90 and toward one another. The groove 1434 is disposed between first and second ends of the slanted surfaces 1430, 1432, respectively, and extends further into the first metallic end plate 90. The pouch battery cell 64 is coupled to the first metallic end plate 90 such that the extension portion 900 of the pouch battery cell 64 is disposed in the groove 1434 of the first metallic end plate 90, and the slanted end surfaces 902, 904 of the pouch battery cell 64 are disposed on and against the thermally conductive adhesive portions 158, 160, respectively, on the slanted surfaces 1430, 1432, respectively, of the first metallic end plate 90.

The slanted surfaces 1440, 1442 extend inwardly into the first metallic end plate 90 and toward one another. The groove 1444 is disposed between first and second ends of the slanted surfaces 1440, 1442, respectively, and extends further into the first metallic end plate 90. The pouch battery cell 66 is coupled to the first metallic end plate 90 such that the extension portion 940 of the pouch battery cell 66 is disposed in the groove 1444 of the first metallic end plate 90, and the slanted end surfaces 942, 944 of the pouch battery cell 66 are disposed on and against the thermally conductive adhesive portions 162, 164, respectively, on the slanted surfaces 1440, 1442, respectively, of the first metallic end plate 90.

The slanted surfaces 1450, 1452 extend inwardly into the first metallic end plate 90 and toward one another. The groove 1454 is disposed between first and second ends of the slanted surfaces 1450, 1452, respectively, and extends further into the first metallic end plate 90. The pouch battery cell 68 is coupled to the first metallic end plate 90 such that the extension portion 980 of the pouch battery cell 68 is disposed in the groove 1454 of the first metallic end plate 90, and the slanted end surfaces 982, 984 of the pouch battery cell 68 are disposed on and against the thermally conductive adhesive portions 166, 168, respectively, on the slanted surfaces 1450, 1452, respectively, of the first metallic end plate 90.

The slanted surfaces 1460, 1462 extend inwardly into the first metallic end plate 90 and toward one another. The groove 1464 is disposed between first and second ends of the slanted surfaces 1460, 1462, respectively, and extends further into the first metallic end plate 90. The pouch battery cell 70 is coupled to the first metallic end plate 90 such that the extension portion 1020 of the pouch battery cell 70 is disposed in the groove 1464 of the first metallic end plate 90, and the slanted end surfaces 1022, 1024 of the pouch battery cell 70 are disposed on and against the thermally conductive adhesive portions 170, 172, respectively, on the slanted surfaces 1460, 1462, respectively, of the first metallic end plate 90.

Referring to FIG. 6, the second side 1302 of the first metallic end plate 90 has receiving brackets 1500, 1502 for holding the conduit 92 therein. The receiving bracket 1500 has first and second finger portions 1510, 1512 and a receiving surface 1514. The receiving surface 1514 is at least partially defined by the first and second finger portions 1510, 1512 and extends into the receiving bracket 1500. The receiving bracket 1502 has first and second finger portions 1520, 1522 and a receiving surface 1524. The receiving surface 1524 is at least partially defined by the first and second finger portions 1520, 1522 and extends into the receiving bracket 1502.

The conduit 92 is disposed against the receiving surface 1514 of the receiving bracket 1500 and is disposed between the finger portions 1510, 1512 of the first metallic end plate 90. Also, the conduit 92 is disposed against the receiving surface 1524 of the receiving bracket 1502 and is disposed between the finger portions 1520, 1522 of the first metallic end plate 90. The conduit 92 has a refrigerant flowing therethrough from the refrigerant supply system 22 such that the first metallic end plate 90 transfers heat energy from the pouch battery cells 40-70 into the refrigerant. The conduit 92 may be coupled to the receiving surfaces 1514, 1524 utilizing a thermally conductive adhesive disposed therebetween.

Referring to FIGS. 1 and 6-8, the second metallic end plate 100 is provided to conduct heat energy from the pouch battery cells 40-70 into a refrigerant flowing through the second metallic end plate 100 from the refrigerant supply system 22. The second metallic end plate 100 has a first side 2300 and a second side 2302. The first side 2300 is coupled to the pouch battery cells 40-70. The second side 2302 is coupled to the conduit 102. In an exemplary embodiment, the second metallic end plate 100 is constructed of aluminum. In an alternative embodiment, the second metallic end plate 100 could be constructed of other thermally conductive metallic materials such as copper or steel for example.

The first side 2300 has slanted surfaces 2310, 2312 and a groove 2314; slanted surfaces 2320, 2322 and a groove 2324; slanted surfaces 2330, 2332 and a groove 2334; slanted surfaces 2340, 2342 and a groove 2344; slanted surfaces 2350, 2352 and a groove 2354; slanted surfaces 2360, 2362 and a groove 2364; slanted surfaces 2370, 2372 and a groove 2374; slanted surfaces 2380, 2382 and a groove 2384; slanted surfaces 2390, 2392 and a groove 2394; slanted surfaces 2400, 2402 and a groove 2404; slanted surfaces 2410, 2412 and a groove 2414; slanted surfaces 2420, 2422 and a groove 2424; slanted surfaces 2430, 2432 and a groove 2434; slanted surfaces 2440, 2442 and a groove 2444; slanted surfaces 2450, 2452 and a groove 2454; and slanted surfaces 2460, 2462 and a groove 2464.

The slanted surfaces 2310, 2312 extend inwardly into the second metallic end plate 100 and toward one another. The groove 2314 is disposed between first and second ends of the slanted surfaces 2310, 2312, respectively, and extends further into the second metallic end plate 100. The pouch battery cell 40 is coupled to the second metallic end plate 100 such that the extension portion 430 of the pouch battery cell 40 is disposed in the groove 2314 of the second metallic end plate 100, and the slanted end surfaces 432, 434 of the pouch battery cell 40 are disposed on and against the thermally conductive adhesive portions 210, 212, respectively, on the slanted surfaces 2310, 2312, respectively, of the second metallic end plate 100.

The slanted surfaces 2320, 2322 extend inwardly into the second metallic end plate 100 and toward one another. The groove 2324 is disposed between first and second ends of the slanted surfaces 2320, 2322, respectively, and extends further into the second metallic end plate 100. The pouch battery cell 42 is coupled to the second metallic end plate 100 such that the extension portion 470 of the pouch battery cell 42 is disposed in the groove 2324 of the second metallic end plate 100, and the slanted end surfaces 472, 474 of the pouch battery cell 42 are disposed on and against the thermally conductive adhesive portions 214, 216, respectively, on the slanted surfaces 2320, 2322, respectively, of the second metallic end plate 100.

The slanted surfaces 2330, 2332 extend inwardly into the second metallic end plate 100 and toward one another. The groove 2334 is disposed between first and second ends of the slanted surfaces 2330, 2332, respectively, and extends further into the second metallic end plate 100. The pouch battery cell 44 is coupled to the second metallic end plate 100 such that the extension portion 510 of the pouch battery cell 44 is disposed in the groove 2334 of the second metallic end plate 100, and the slanted end surfaces 512, 514 of the pouch battery cell 44 are disposed on and against the thermally conductive adhesive portions 218, 220, respectively, on the slanted surfaces 2330, 2332, respectively, of the second metallic end plate 100.

The slanted surfaces 2340, 2342 extend inwardly into the second metallic end plate 100 and toward one another. The groove 2344 is disposed between first and second ends of the slanted surfaces 2340, 2342, respectively, and extends further into the second metallic end plate 100. The pouch battery cell 46 is coupled to the second metallic end plate 100 such that the extension portion 550 of the pouch battery cell 46 is disposed in the groove 2344 of the second metallic end plate 100, and the slanted end surfaces 552, 554 of the pouch battery cell 46 are disposed on and against the thermally conductive adhesive portions 222, 224, respectively, on the slanted surfaces 2340, 2342, respectively, of the second metallic end plate 100.

The slanted surfaces 2350, 2352 extend inwardly into the second metallic end plate 100 and toward one another. The groove 2354 is disposed between first and second ends of the slanted surfaces 2350, 2352, respectively, and extends further into the second metallic end plate 100. The pouch battery cell 48 is coupled to the second metallic end plate 100 such that the extension portion 590 of the pouch battery cell 48 is disposed in the groove 2354 of the second metallic end plate 100, and the slanted end surfaces 592, 594 of the pouch battery cell 48 are disposed on and against the thermally conductive adhesive portions 226, 228, respectively, on the slanted surfaces 2350, 2352, respectively, of the second metallic end plate 100.

The slanted surfaces 2360, 2362 extend inwardly into the second metallic end plate 100 and toward one another. The groove 2364 is disposed between first and second ends of the slanted surfaces 2360, 2362, respectively, and extends further into the second metallic end plate 100. The pouch battery cell 50 is coupled to the second metallic end plate 100 such that the extension portion 630 of the pouch battery cell 50 is disposed in the groove 2364 of the second metallic end plate 100, and the slanted end surfaces 632, 634 of the pouch battery cell 50 are disposed on and against the thermally conductive adhesive portions 230, 232, respectively, on the slanted surfaces 2360, 2362, respectively, of the second metallic end plate 100.

The slanted surfaces 2370, 2372 extend inwardly into the second metallic end plate 100 and toward one another. The groove 2374 is disposed between first and second ends of the slanted surfaces 2370, 2372, respectively, and extends further into the second metallic end plate 100. The pouch battery cell 52 is coupled to the second metallic end plate 100 such that the extension portion 670 of the pouch battery cell 52 is disposed in the groove 2374 of the second metallic end plate 100, and the slanted end surfaces 672, 674 of the pouch battery cell 52 are disposed on and against the thermally conductive adhesive portions 234, 236, respectively, on the slanted surfaces 2370, 2372, respectively, of the second metallic end plate 100.

The slanted surfaces 2380, 2382 extend inwardly into the second metallic end plate 100 and toward one another. The groove 2384 is disposed between first and second ends of the slanted surfaces 2380, 2382, respectively, and extends further into the second metallic end plate 100. The pouch battery cell 54 is coupled to the second metallic end plate 100 such that the extension portion 710 of the pouch battery cell 54 is disposed in the groove 2384 of the second metallic end plate 100, and the slanted end surfaces 712, 714 of the pouch battery cell 54 are disposed on and against the thermally conductive adhesive portions 238, 240, respectively, on the slanted surfaces 2380, 2382, respectively, of the second metallic end plate 100.

The slanted surfaces 2390, 2392 extend inwardly into the second metallic end plate 100 and toward one another. The groove 2394 is disposed between first and second ends of the slanted surfaces 2390, 2392, respectively, and extends further into the second metallic end plate 100. The pouch battery cell 56 is coupled to the second metallic end plate 100 such that the extension portion 750 of the pouch battery cell 56 is disposed in the groove 2394 of the second metallic end plate 100, and the slanted end surfaces 752, 754 of the pouch battery cell 56 are disposed on and against the thermally conductive adhesive portions 242, 244, respectively, on the slanted surfaces 2390, 2392, respectively, of the second metallic end plate 100.

The slanted surfaces 2400, 2402 extend inwardly into the second metallic end plate 100 and toward one another. The groove 2404 is disposed between first and second ends of the slanted surfaces 2400, 2402, respectively, and extends further into the second metallic end plate 100. The pouch battery cell 58 is coupled to the second metallic end plate 100 such that the extension portion 790 of the pouch battery cell 58 is disposed in the groove 2404 of the second metallic end plate 100, and the slanted end surfaces 792, 794 of the pouch battery cell 58 are disposed on and against the thermally conductive adhesive portions 246, 248, respectively, on the slanted surfaces 2400, 2402, respectively, of the second metallic end plate 100.

The slanted surfaces 2410, 2412 extend inwardly into the second metallic end plate 100 and toward one another. The groove 2414 is disposed between first and second ends of the slanted surfaces 2410, 2412, respectively, and extends further into the second metallic end plate 100. The pouch battery cell 60 is coupled to the second metallic end plate 100 such that the extension portion 830 of the pouch battery cell 60 is disposed in the groove 21414 of the second metallic end plate 100, and the slanted end surfaces 832, 834 of the pouch battery cell 60 are disposed on and against the thermally conductive adhesive portions 250, 252, respectively, on the slanted surfaces 2410, 2412, respectively, of the second metallic end plate 100.

The slanted surfaces 2420, 2422 extend inwardly into the second metallic end plate 100 and toward one another. The groove 2424 is disposed between first and second ends of the slanted surfaces 2420, 2422, respectively, and extends further into the second metallic end plate 100. The pouch battery cell 62 is coupled to the second metallic end plate 100 such that the extension portion 870 of the pouch battery cell 62 is disposed in the groove 2424 of the second metallic end plate 100, and the slanted end surfaces 872, 874 of the pouch battery cell 62 are disposed on and against the thermally conductive adhesive portions 254, 256, respectively, on the slanted surfaces 2420, 2422, respectively, of the second metallic end plate 100.

The slanted surfaces 2430, 2432 extend inwardly into the second metallic end plate 100 and toward one another. The groove 2434 is disposed between first and second ends of the slanted surfaces 2430, 2432, respectively, and extends further into the second metallic end plate 100. The pouch battery cell 64 is coupled to the second metallic end plate 100 such that the extension portion 910 of the pouch battery cell 64 is disposed in the groove 2434 of the second metallic end plate 100, and the slanted end surfaces 912, 914 of the pouch battery cell 64 are disposed on and against the thermally conductive adhesive portions 258, 260, respectively, on the slanted surfaces 2430, 2432, respectively, of the second metallic end plate 100.

The slanted surfaces 2440, 2442 extend inwardly into the second metallic end plate 100 and toward one another. The groove 2444 is disposed between first and second ends of the slanted surfaces 2440, 2442, respectively, and extends further into the second metallic end plate 100. The pouch battery cell 66 is coupled to the second metallic end plate 100 such that the extension portion 950 of the pouch battery cell 66 is disposed in the groove 2444 of the second metallic end plate 100, and the slanted end surfaces 952, 954 of the pouch battery cell 66 are disposed on and against the thermally conductive adhesive portions 262, 264, respectively, on the slanted surfaces 2440, 2442, respectively, of the second metallic end plate 100.

The slanted surfaces 2450, 2452 extend inwardly into the second metallic end plate 100 and toward one another. The groove 2454 is disposed between first and second ends of the slanted surfaces 2450, 2452, respectively, and extends further into the second metallic end plate 100. The pouch battery cell 68 is coupled to the second metallic end plate 100 such that the extension portion 990 of the pouch battery cell 68 is disposed in the groove 2454 of the second metallic end plate 100, and the slanted end surfaces 992, 994 of the pouch battery cell 68 are disposed on and against the thermally conductive adhesive portions 266, 268, respectively, on the slanted surfaces 2450, 2452, respectively, of the second metallic end plate 100.

The slanted surfaces 2460, 2462 extend inwardly into the second metallic end plate 100 and toward one another. The groove 2464 is disposed between first and second ends of the slanted surfaces 2460, 2462, respectively, and extends further into the second metallic end plate 100. The pouch battery cell 70 is coupled to the second metallic end plate 100 such that the extension portion 1030 of the pouch battery cell 70 is disposed in the groove 2464 of the second metallic end plate 100, and the slanted end surfaces 1032, 1034 of the pouch battery cell 70 are disposed on and against the thermally conductive adhesive portions 270, 272, respectively, on the slanted surfaces 2460, 2462, respectively, of the second metallic end plate 100.

Referring to FIG. 6, the second side 2302 of the second metallic end plate 100 has receiving brackets 2500, 2502 for holding the conduit 102 therein. The receiving bracket 2500 has first and second finger portions 2510, 2512 and a receiving surface 2514. The receiving surface 2514 is at least partially defined by the first and second finger portions 2510, 2512 and extends into the receiving bracket 2500. The receiving bracket 2502 has first and second finger portions 2520, 2522 and a receiving surface 2524. The receiving surface 2524 is at least partially defined by the first and second finger portions 2520, 2522 and extends into the receiving bracket 2502.

The conduit 102 is disposed against the receiving surface 2514 of the receiving bracket 2500 and is disposed between the finger portions 2510, 2512 of the second metallic end plate 100. Also, the conduit 102 is disposed against the receiving surface 2524 of the receiving bracket 2502 and is disposed between the finger portions 2520, 2522 of the second metallic end plate 100. The conduit 102 has a refrigerant flowing therethrough from the refrigerant supply system 22 such that the second metallic end plate 100 transfers heat energy from the pouch battery cells 40-70 into the refrigerant. The conduit 102 may be coupled to the receiving surfaces 2514, 2524 utilizing a thermally conductive adhesive disposed therebetween.

Figure 5:
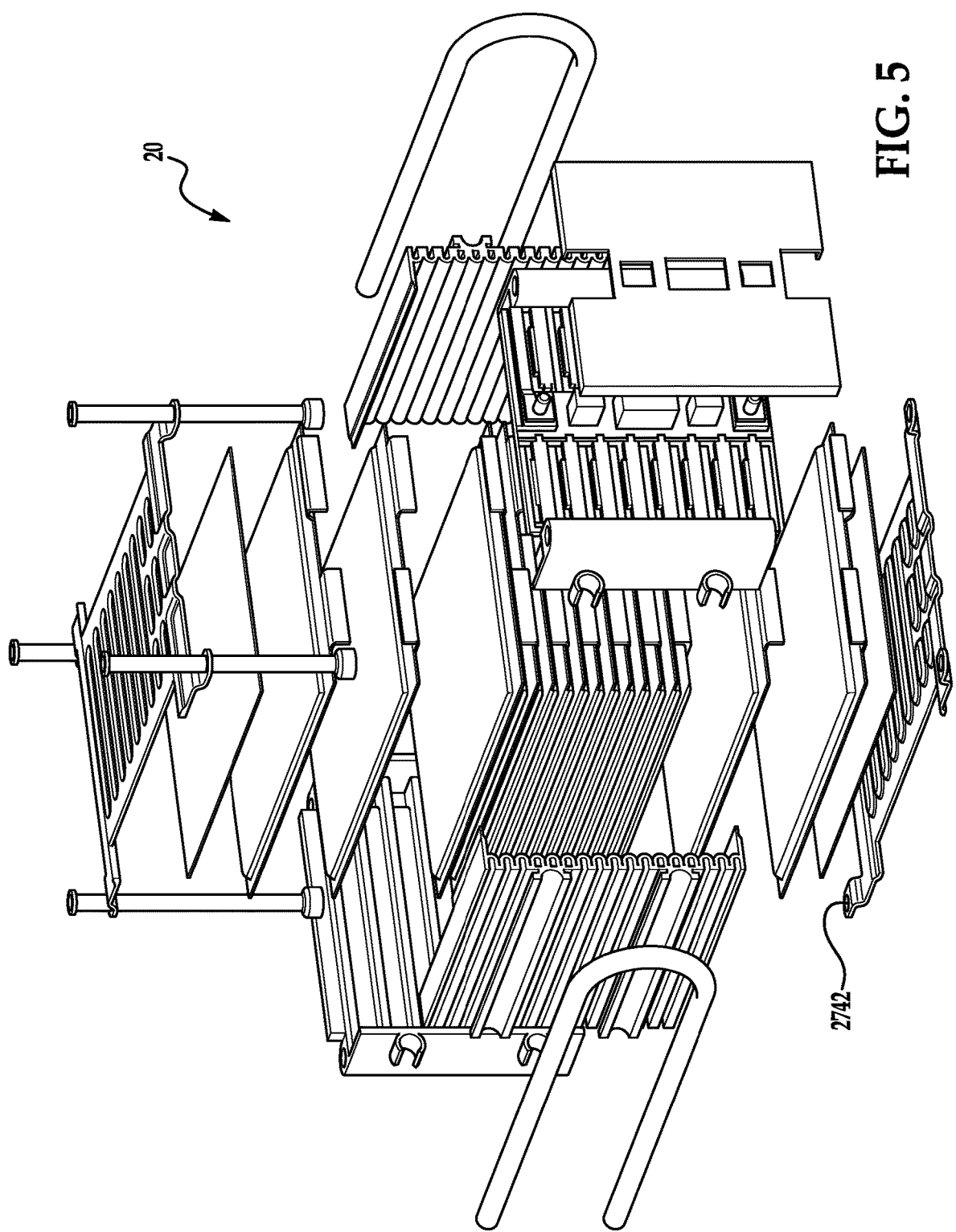
FIG. 5 is another exploded schematic of the battery module of FIG. 3.

Referring to FIGS. 4-6, the end plate 300 includes apertures 2640, 2642, 2650, 2652 extending therethrough. The end plate 300 is disposed against first ends of the first and second metallic end plates 90, 100, and is further disposed against the foam layer 310.

The end plate 302 includes apertures 2740, 2742, 2750, 2752 extending therethrough. The end plate 302 is disposed against second ends of the first and second metallic end plates 90, 100, and is further disposed against the foam layer 326.

The shaft members 340, 342, 350, 352 extend through apertures 2640, 2642, 2650, 2652, respectively, in the end plate 300, and further extend through apertures 2740, 2742, 2750, 2752, respectively, in the end plate 302 to couple the end plates 300, 302 to one another such that the pouch battery cells 40-72 and the foam layers 310-326 are fixedly held between the end plates 300, 302.

Referring to FIG. 6, the foam layer 310 is disposed between and contacts both the end plate 300 and a major surface 410 of the pouch battery cell 40. The foam layer 312 is disposed between and contacts both a major surface 452 of the pouch battery cell 42 and a major surface 490 of the pouch battery cell 44. The foam layer 314 is disposed between and contacts both a major surface 532 of the pouch battery cell 46 and a major surface 570 of the pouch battery cell 48. The foam layer 316 is disposed between and contacts both a major surface 612 of the pouch battery cell 50 and a major surface 652 of the pouch battery cell 52. The foam layer 318 is disposed between and contacts both a major surface 692 of the pouch battery cell 54 and a major surface 730 of the pouch battery cell 56. The foam layer 320 is disposed between and contacts both a major surface 772 of the pouch battery cell 58 and a major surface 810 of the pouch battery cell 60. The foam layer 322 is disposed between and contacts both a major surface 852 of the pouch battery cell 62 and a major surface 890 of the pouch battery cell 64. The foam layer 324 is disposed between and contacts both a major surface 932 of the pouch battery cell 66 and a major surface 970 of the pouch battery cell 68. The foam layer 326 is disposed between and contacts both a major surface 1012 of the pouch battery cell 70 and the end plate 302.

Referring to FIGS. 4, 6, 13, and 14, the interconnect board 330 is disposed between and is coupled to the end plates 300, 302. The interconnect board 330 electrically couples the pouch battery cells 40-70 to one another utilizing a plurality electrical tabs 2830. The interconnect board 330 includes a central wall 2800, a first side wall 2802, a second side wall 2804, C-shaped coupling tabs 2810, 2812, 2814, 2816, and the plurality electrical tabs 2830. In an exemplary embodiment, the central wall 2800, the first side wall 2802, the second side wall 2004, and the C-shaped coupling tabs 2810, 2812, 2814, 2816 are constructed of plastic.

The first side wall 2802 is coupled to a first end of the central wall 2800. The first side wall 2802 includes an aperture 2840 extending therethrough that is configured to receive the shaft member 340 (shown in FIG. 4) therethrough.

The second side wall 2804 is coupled to a second end of the central wall 2800. The second side wall 2804 includes an aperture 2850 extending therethrough that is configured to receive the shaft member 350 (shown in FIG. 4) therethrough.

The C-shaped coupling tabs 2810, 2812 are coupled to and extend outwardly from the first side wall 2802. The C-shaped coupling tabs 2810, 2812 are configured to hold portions of the conduit 92 therein.

The C-shaped coupling tabs 2814, 2816 are coupled to and extend outwardly from the second side wall 2804. The C-shaped coupling tabs 2814, 2816 are configured to hold portions of the conduit 102 therein.

Figure 15:
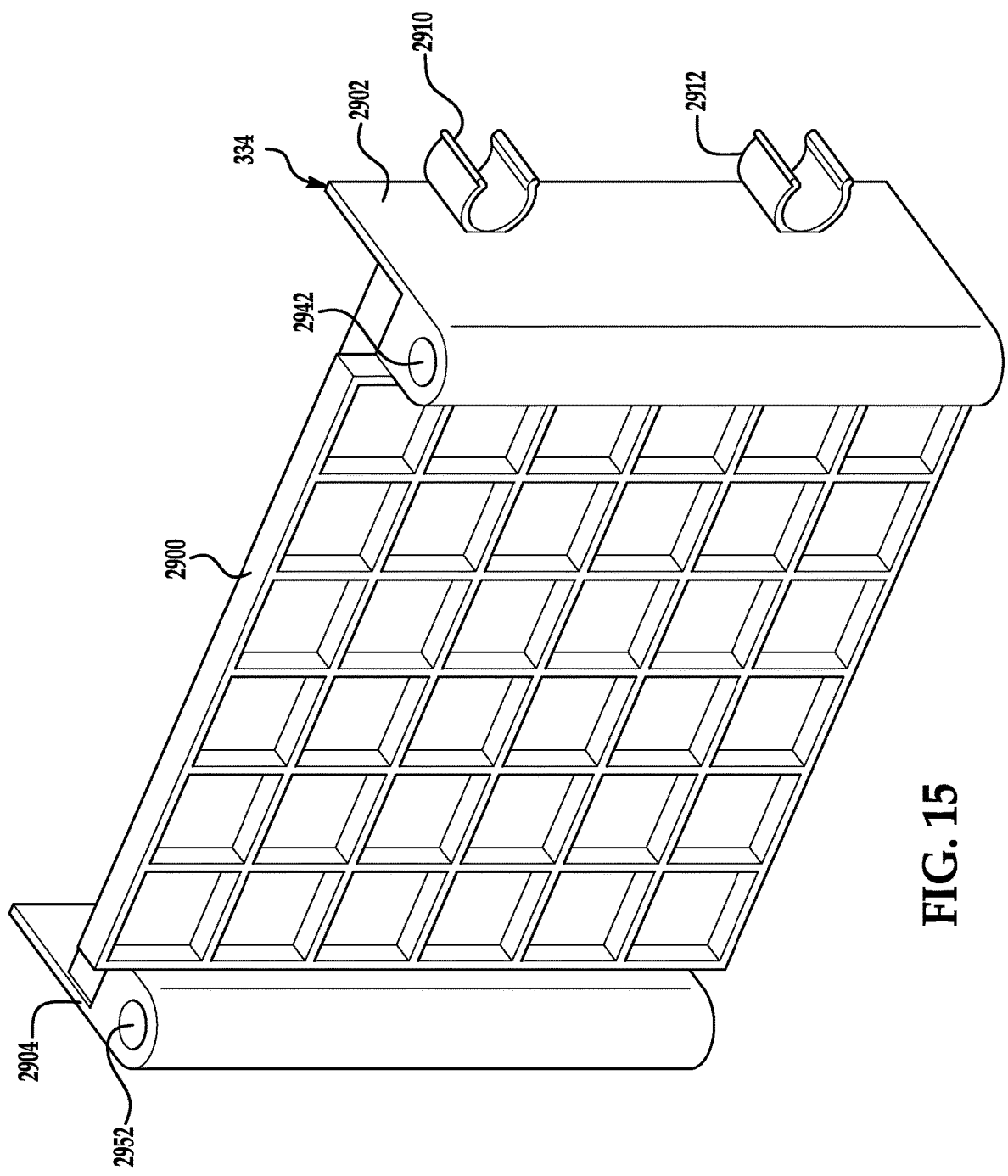
FIG. 15 is a schematic of a side member utilized in the battery module of FIG. 3.
Figure 16:
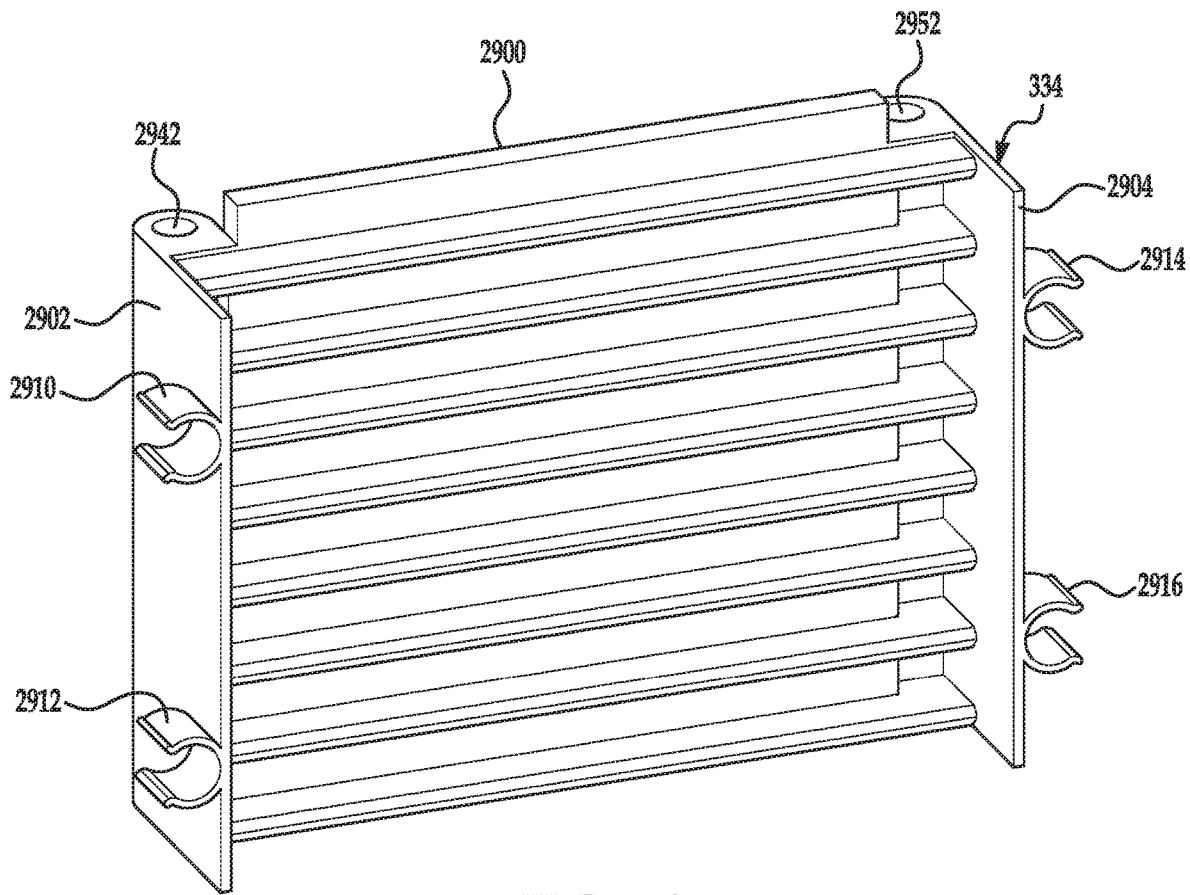
FIG. 16 is another schematic of the side member of FIG. 15.

Referring to FIGS. 4, 15 and 16, the side member 334 is disposed between and is coupled to the end plates 300, 302. The side member 334 includes a central wall 2900, a first side wall 2902, a second side wall 2904, C-shaped coupling tabs 2910, 2912, 2914, 2916. In an exemplary embodiment, the central wall 2900, the first side wall 2902, the second side wall 2904, and the C-shaped coupling tabs 2910, 2912, 2914, 2916 are constructed of plastic.

The first side wall 2902 is coupled to a first end of the central wall 2900. The first side wall 2902 includes an aperture 2942 extending therethrough that is configured to receive the shaft member 342 (shown in FIG. 4) therethrough.

The second side wall 2904 is coupled to a second end of the central wall 2900. The second side wall 2904 includes an aperture 2952 extending therethrough that is configured to receive the shaft member 352 (shown in FIG. 4) therethrough.

The C-shaped coupling tabs 2910, 2912 are coupled to and extend outwardly from the first side wall 2902. The C-shaped coupling tabs 2910, 2912 are configured to hold portions of the conduit 92 therein.

The C-shaped coupling tabs 2914, 2916 are coupled to and extend outwardly from the second side wall 2904. The C-shaped coupling tabs 2914, 2916 are configured to hold portions of the conduit 102 therein.

Referring to FIGS. 1-4, the refrigerant supply system 22 is fluidly coupled to the conduits 92, 102. The refrigerant supply system 22 routes a refrigerant to the conduit 92 and receives the refrigerant from the conduit 92. Further, the refrigerant supply system 22 routes a refrigerant to the conduit 102 and receives the refrigerant from the conduit 102.

The battery system described herein provides a substantial advantage over other battery systems. In particular, an advantage of the battery system is that the system utilizes metallic end plates that are coupled to end portions of pouch battery cells of a battery module via thermally conductive adhesive portions to transfer heat energy from the pouch battery cells to the metallic end plates and further to transfer the heat energy to a refrigerant flowing through the metallic end plates, without utilizing internal cooling fins disposed between the pouch battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
a first metallic end plate having a first side and a second side, the first side of the first metallic end plate having first and second slanted surfaces and a first groove, the first and second slanted surfaces of the first metallic end plate extending inwardly into the first metallic end plate toward one another and ending at the first groove of the first metallic end plate, the first groove being disposed between first and second ends of the first and second slanted surfaces, respectively, of the first metallic end plate and extending from the first and second ends of the first and second slanted surfaces, respectively, further into the first metallic end plate toward the second side of the first metallic end plate;
a first pouch battery cell having a first pouch housing with a first end portion, the first end portion of the first pouch housing having a first extension portion and first and second slanted end surfaces;
first and second thermally conductive adhesive portions being disposed on the first and second slanted surfaces, respectively, of the first metallic end plate and being spaced apart from one another;
the first pouch battery cell being coupled to the first metallic end plate such that the first extension portion of the first pouch battery cell is disposed between the first and second thermally conductive adhesive portions and in the first groove of the first metallic end plate, and the first and second slanted end surfaces of the first pouch battery cell are disposed on and against the first and second thermally conductive adhesive portions, respectively, on the first and second slanted surfaces, respectively, of the first metallic end plate.

2. The battery system of claim 1, wherein:
the first pouch housing having a second end portion;
the first extension portion of the first pouch housing having a first end and a second end, the first slanted end surface of the first pouch housing extending from the first end of the first extension portion of the first pouch housing, the second slanted end surface of the first pouch housing extending from the first end of the first extension portion of the first pouch housing and away from the first slanted end surface of the first pouch housing;
the second side of the first metallic end plate having a first receiving bracket with first and second finger portions and a first receiving surface, the first receiving surface of the first metallic end plate being at least partially defined by the first and second finger portions of the first metallic end plate and extending into the first receiving bracket of the first metallic end plate; and
a first conduit portion being disposed against the first receiving surface of the first receiving bracket and being disposed between the first and second finger portions of the first metallic end plate, the first conduit portion having a refrigerant flowing therethrough such that the first metallic end plate transfers heat energy from the first pouch battery cell into the refrigerant.

3. The battery system of claim 2, further comprising a third thermally conductive adhesive portion being disposed on the first receiving surface of the first receiving bracket and coupling the first conduit portion to the first receiving bracket.

4. The battery system of claim 2, wherein the second end portion of the first pouch housing having a second extension portion, and a length of the second extension portion being greater than a length of the first extension portion.

5. The battery system of claim 1, wherein the first metallic end plate further having third and fourth slanted surfaces and a second groove, the third and fourth slanted surfaces of the first metallic end plate extending inwardly into the first metallic end plate toward one another and ending at the second groove of the first metallic end plate, the second groove of the first metallic end plate being disposed between first and second ends of the third and fourth slanted surfaces, respectively and extending from the first and second ends of the third and fourth slanted surfaces, respectively, further into the first metallic end plate toward the second side of the first metallic end plate; the battery system further having:
a second pouch battery cell having a second pouch housing with a first end portion, a second end portion, and a first major surface disposed between the first and second end portions thereof; the first major surface of the second pouch battery cell being disposed on and directly against a first major surface of the first pouch battery cell; the first end portion of the second pouch housing having a first extension portion and first and second slanted end surfaces;
third and fourth thermally conductive adhesive portions being disposed on the third and fourth slanted surfaces, respectively, of the first metallic end plate and being spaced apart from one another;
the second pouch battery cell being coupled to the first metallic end plate such that the first extension portion of the second pouch battery cell is disposed between the first and second thermally conductive adhesive portions and in the second groove of the first metallic end plate, and the first and second slanted end surfaces of the second pouch battery cell are disposed on and against the third and fourth thermally conductive adhesive portions, respectively, on the third and fourth slanted surfaces, respectively, of the first metallic end plate.

6. The battery system of claim 5, wherein:
the first extension portion of the second pouch housing having a first end and a second end, the first slanted end surface of the second pouch housing extending from the first end of the first extension portion of the second pouch housing, the second slanted end surface of the second pouch housing extending from the first end of the first extension portion of the second pouch housing and away from the first slanted end surface of the second pouch housing.

7. The battery system of claim 1, wherein the first metallic end plate is constructed of aluminum.

8. The battery system of claim 1, further comprising:
a second metallic end plate having a first side and a second side, the first side of the second metallic end plate having first and second slanted surfaces and a first groove, the first and second slanted surfaces of the second metallic end plate extending inwardly into the second metallic end plate toward one another and ending at the first groove of the second metallic end plate, the first groove of the second metallic end plate being disposed between first and second ends of the first and second slanted surfaces, respectively, of the second metallic end plate and extending from the first and second ends of the first and second slanted surfaces, respectively, of the second metallic end plate further into the second metallic end plate toward the second side of the second metallic end plate;
a second end portion of the first pouch housing of the first pouch battery cell having a second extension portion and third and fourth slanted end surfaces;
the first pouch battery cell being further coupled to the second metallic end plate such that the second extension portion of the first pouch battery cell is disposed in the first groove of the second metallic end plate, and the third and fourth slanted end surfaces of the first pouch battery cell are disposed on and against third and fourth thermally conductive adhesive portions, respectively, on the first and second slanted surfaces, respectively, of the second metallic end plate.

9. The battery system of claim 8, wherein the second metallic end plate is constructed of aluminum.

10. The battery system of claim 8, wherein:
the second extension portion of the first pouch housing having a first end and a second end, the third slanted end surface of the first pouch housing extending from the first end of the second extension portion of the first pouch housing, the fourth slanted end surface of the first pouch housing extending from the first end of the second extension portion of the first pouch housing and away from the third slanted end surface of the first pouch housing;
the second side of the second metallic end plate having a first receiving bracket with first and second finger portions and a first receiving surface, the first receiving surface of the second metallic end plate being at least partially defined by the first and second finger portions of the second metallic end plate and extending into the first receiving bracket of the second metallic end plate; and
a second conduit portion being disposed against the first receiving surface of the second receiving bracket and being disposed between the first and second finger portions of the second metallic end plate, the second conduit portion having a refrigerant flowing therethrough such that the second metallic end plate transfers heat energy from the first pouch battery cell into the refrigerant.

\* \* \* \* \*